(12) United States Patent
Coles et al.

(10) Patent No.: US 7,015,664 B2
(45) Date of Patent: Mar. 21, 2006

(54) MOTOR DRIVE CONTROL

(75) Inventors: Jeffrey Ronald Coles, Solihull (GB); Connel Williams, Leamington Spa (GB)

(73) Assignee: TRW Limited, (GB)

( * ) Notice: Subject to any disclaimer, the term of this patent is extended or adjusted under 35 U.S.C. 154(b) by 0 days.

(21) Appl. No.: 11/071,534

(22) Filed: Mar. 3, 2005

(65) Prior Publication Data

US 2005/0269982 A1    Dec. 8, 2005

Related U.S. Application Data

(63) Continuation of application No. PCT/GB03/03817, filed on Sep. 3, 2003.

(30) Foreign Application Priority Data

Sep. 3, 2002    (GB) .................................. 0220401

(51) Int. Cl.
*H02P 3/18*    (2006.01)

(52) U.S. Cl. ..................... 318/254; 318/138; 318/439; 318/599

(58) Field of Classification Search ................ 318/138, 318/254, 439, 499, 432, 434
See application file for complete search history.

(56) References Cited

U.S. PATENT DOCUMENTS

| | | | | |
|---|---|---|---|---|
| 4,841,207 A | * | 6/1989 | Cheyne | 388/811 |
| 5,343,129 A | * | 8/1994 | Hans et al. | 318/431 |
| 5,598,073 A | * | 1/1997 | Hans et al. | 318/431 |
| 6,002,234 A | * | 12/1999 | Ohm et al. | 318/729 |
| 6,172,498 B1 | | 1/2001 | Schmidt et al. | |
| 6,555,977 B1 | * | 4/2003 | Du et al. | 318/254 |
| 6,703,805 B1 | * | 3/2004 | Griffitts | 318/459 |

FOREIGN PATENT DOCUMENTS

| | | |
|---|---|---|
| DE | 198 38 227 | 2/2000 |
| EP | 0 856 937 | 8/1998 |

OTHER PUBLICATIONS

Ogasawara, S., et al., "An Approach to Real-Time Position Estimation at Zero and Low Speed for a PM Motor Based on Saliency"; IEEE Transactions on Industry Applications, vol. 34, No. 1, Jan. 1998, pp. 163-169.

* cited by examiner

*Primary Examiner*—Rina Duda
(74) *Attorney, Agent, or Firm*—MacMillan, Sobanski & Todd, LLC

(57) ABSTRACT

A drive system for a three phase brushless motor uses an algorithm for position sensing which measures the inductance in the motor phases and determines the position from the measured inductances. In order to reduce acoustic noise, the inductances are measured during test periods $T_{sd}$, which are conducting states added to the PWM pattern in each PWM period. The test periods have net voltage of zero and therefore do not affect the output of the motor, but are sufficiently long to allow inductance measuring as well as the use of a single current sensor for current sensing.

27 Claims, 16 Drawing Sheets

State 1 : [100]

State 2 : [110]

State 3 : [010]

State 4 : [011]

State 5 : [001]

State 6 : [101]

State 0 : [000]

State 7 : [111]

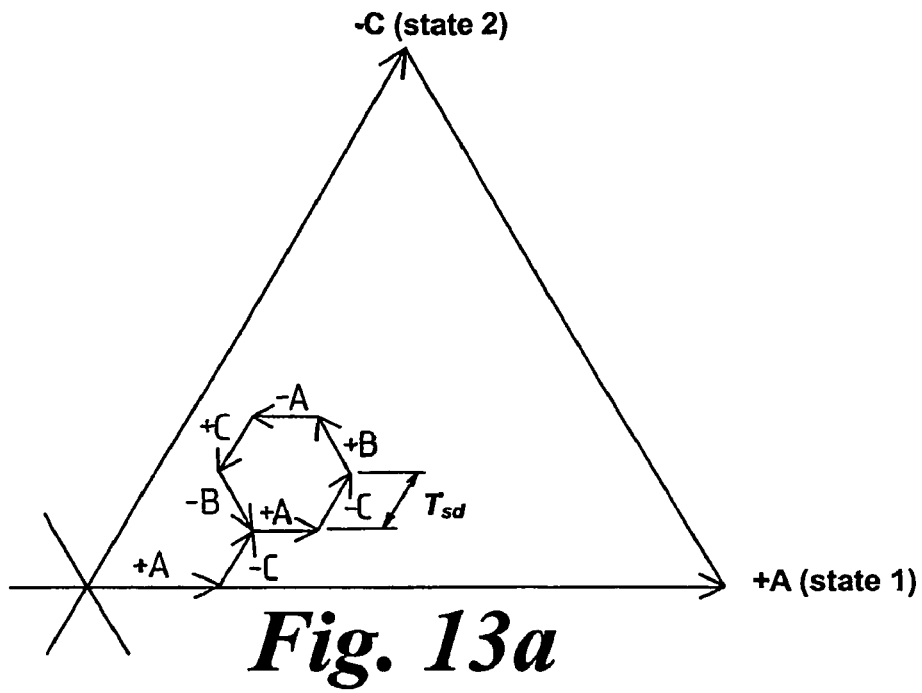
Fig. 13a
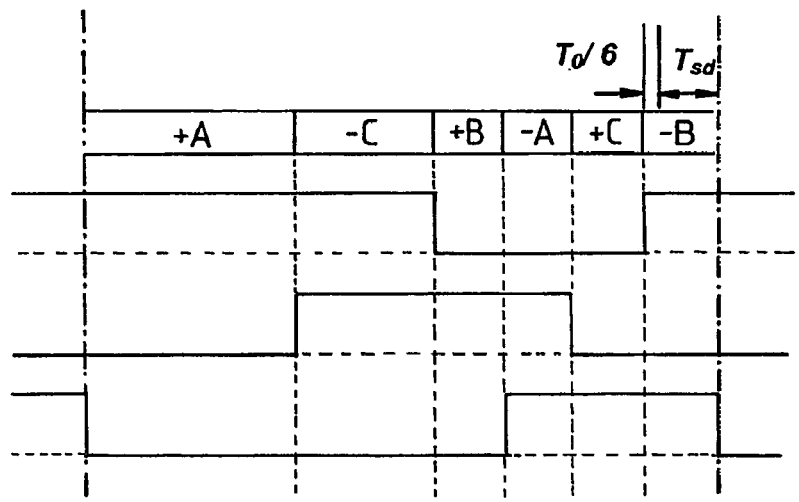
Fig. 13b
State Summary
| +A | -C | +B | -A | +C | -B |
|----|----|----|----|----|----|
| 1  | 1  | 0  | 0  | 0  | 1  |
| 0  | 1  | 1  | 1  | 0  | 0  |
| 0  | 0  | 0  | 1  | 1  | 1  |
Fig. 13c

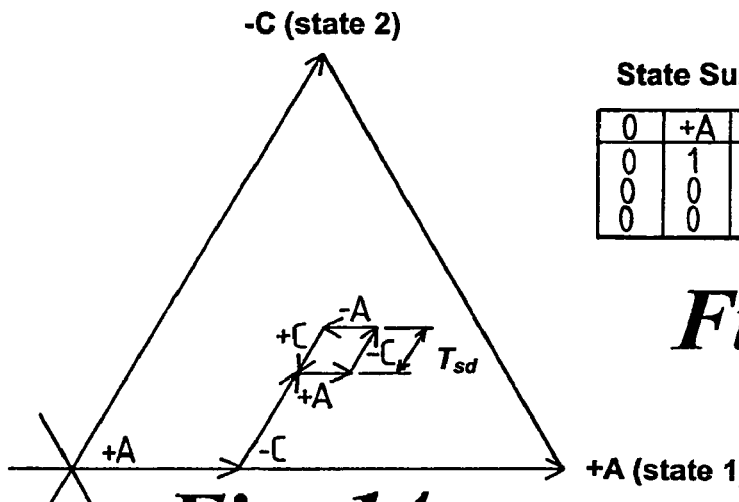
Fig. 14a
State Summary
| 0 | +A | -C | ? | -A | +C | 0 |
|---|---|---|---|---|---|---|
| 0 | 1 | 1 | 1 | 0 | 0 | 0 |
| 0 | 0 | 1 | 1 | 1 | 0 | 0 |
| 0 | 0 | 0 | 1 | 1 | 1 | 0 |
Fig. 14b
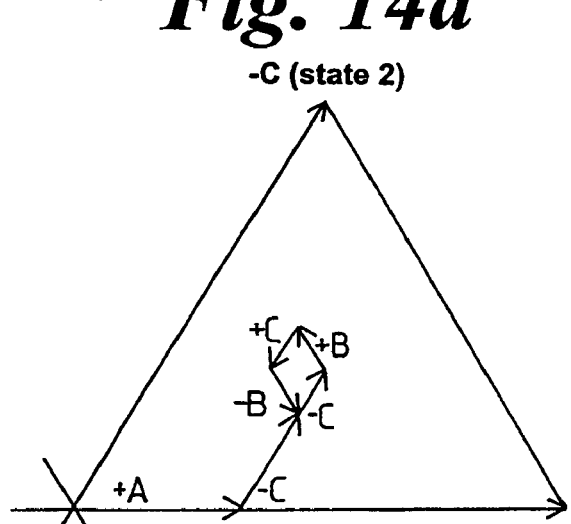
Fig. 15a
State Summary
| 0 | +C | -B | +A | -C | +B | 0 |
|---|---|---|---|---|---|---|
| 0 | 0 | 1 | 1 | 1 | 0 | 0 |
| 0 | 0 | 1 | 0 | 1 | 1 | 0 |
| 0 | 1 | 1 | 0 | 0 | 0 | 0 |
Fig. 15b
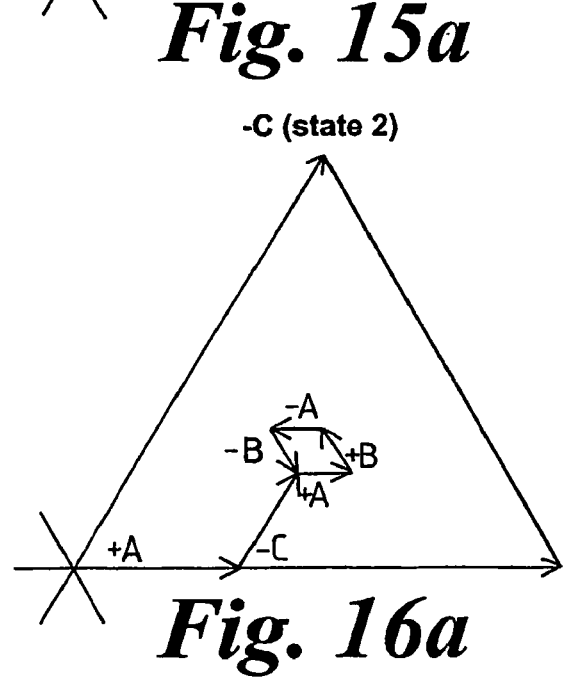
Fig. 16a
State Summary
| +A | -C | +B | -A | -B |
|---|---|---|---|---|
| 1 | 1 | 0 | 0 | 1 |
| 0 | 1 | 1 | 1 | 0 |
| 0 | 0 | 0 | 1 | 1 |
Fig. 16b

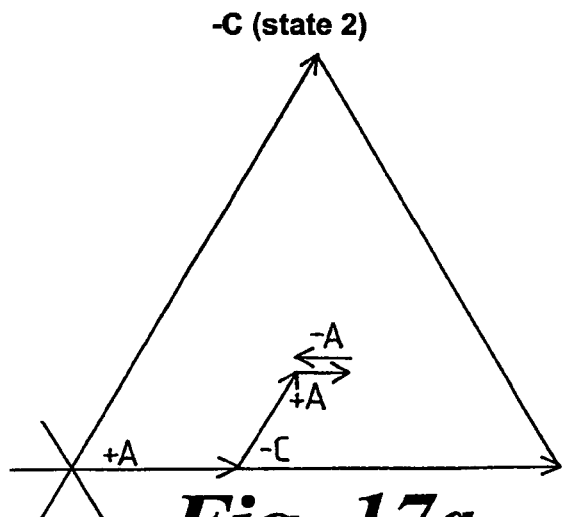
Fig. 17a
Fig. 17b
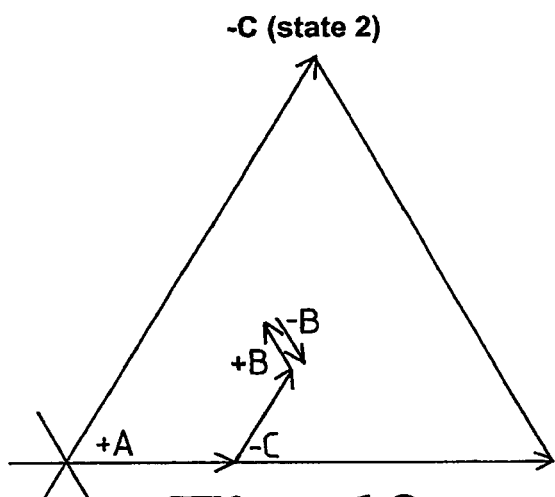
Fig. 18a
Fig. 18b
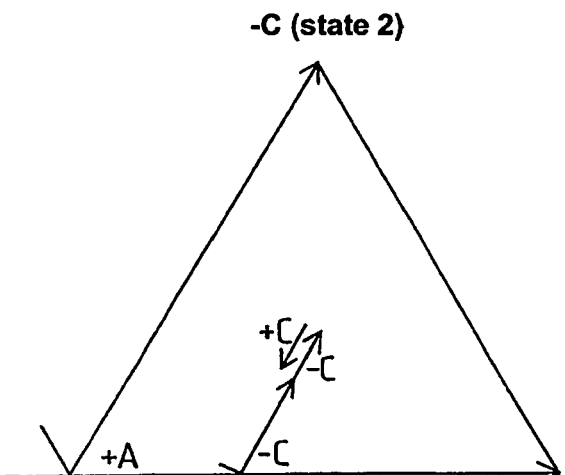
Fig. 19a
Fig. 19b

*$T_A$ = on time for phase A PWM

MOTOR DRIVE CONTROL

CROSS-REFERENCE TO RELATED APPLICATIONS

This application is a continuation of International Application No. PCT/GB2003/003817 filed Sep. 3, 2003, the disclosures of which are incorporated herein by reference, and Great Britain Application No. 0220401.4 filed Sep. 3, 2002, the disclosures of which are incorporated herein by reference.

BACKGROUND OF THE INVENTION

This invention relates to electric motor control, and in particular to pulse width modulation (PWM) control of multiple phase brushless motors.

In order to control an electric motor it is necessary to determine the position of the rotor as it rotates relative to the stator, so that the current through the motor windings can be controlled to produce the desired torque. This can be achieved using a dedicated position sensor, or by estimating the position from other parameters using a position sensorless control scheme.

Position sensorless control schemes reduce system costs by replacing the position sensor that measures the rotor position with a position estimator algorithm in the controller. This algorithm determines the position of the rotor using knowledge of the applied phase or line—line voltages, the measured phase voltages, and a model of the motor drive system.

There are many known techniques for implementing sensorless control, but they fall into two broad categories. The most established category is the back-emf detection algorithm, which is suitable for detecting the motor position from low speed to the maximum speed of the motor. Back-emf detection algorithms use a model of the motor fed with the known values of the applied voltages and measured voltages, which enables them to robustly determine the rotor back-emf, and hence the position of the rotor. However, these algorithms cannot detect the position down to zero speed because there is no back emf to detect at zero speed.

The second category is the voltage-injection technique, which has emerged over recent years to enable the rotor position to be determined at low speeds and standstill. In voltage injection algorithms, a known voltage signal is superposed onto the normal applied phase voltages. The rate of change of current induced by this voltage signal is then measured, enabling the instantaneous inductance of that phase winding to be determined. By calculating the instantaneous inductance of all three phases, it is possible to detect the position of the rotor based on a simple model of inductance variation over position. These inductance variations will tend to be caused by either rotor saliency, localised saturation of the stator tooth tips due to the rotor field, or a combination of both. Since the injected voltage signal does not produce useful motive torque, it reduces the maximum "useful" voltage at the windings. To avoid compromising the power output of the motor, voltage injection techniques tend to be used in combination with a back-emf detection technique. The voltage injection technique provides position information from zero to low speed (where low speed is typically 10–20% of base speed), and the back-emf technique provides the position at low to high speeds, as shown in FIG. 1.

The principles underlying the voltage injection technique are as follows. A positive voltage is applied to one phase of the motor, and the resulting rate of change of the current is measured. A negative voltage is then applied and the rate of change of current is measured again. From the applied voltages and measured rates of change of current, it is possible to eliminate the unknown back-emf term and determine the instantaneous inductance of that phase. By measuring the instantaneous inductance of all three phases, the position of the rotor can be determined.

An example of a known waveform is shown in FIG. 2. This waveform is used to determine the inductance of a single phase. The phase current is sampled three times during the test pattern to determine the rising and falling rates of change of current. A different phase inductance is measured each time the test pattern is applied, so that after a period of typically a few ms all three of the phase inductances are known, and the position can be determined.

Obviously with this technique, it is not possible to measure all three inductances simultaneously. However, each time a new inductance is measured, a new position is calculated. This calculation is based on the latest inductance value for each phase, so that although one phase will have a very recent measurement of inductance, the value for the other two phases will be somewhat older.

This technique can work reasonably well and has some advantages such as the ability to determine position without prior knowledge of motor parameters and reasonably low computational requirements. However, there are some obvious disadvantages. One problem is that because the inductances are not sampled simultaneously, there is some error introduced into the position measurement. This error will be exacerbated if either the d- or q-axis inductances change rapidly with operating conditions, which could be the case with certain types of buried magnet motors. The delay between the measurements also introduces further time delays into the position response of the system. This reduces the dynamic capability of the drive, which can be a problem, particularly in a servo-drive system.

The biggest problem with this approach is the generation of acoustic noise. Interrupting the PWM pattern every 1–2 ms produces a strong acoustic tone in the 250–500 Hz range. Practical demonstrations of such a system suggest that as it stands this noise would be unacceptable for most automotive applications.

Thus, it would be desirable to provide a motor control system including a position detection system that would reduce acoustic noise.

EP 0 856 937 discloses a motor position detection system in which the rate of change of current in the active stator coils is measured during the normal PWM cycle, and used to determine rotor positions.

BRIEF SUMMARY OF THE INVENTION

The present invention provides a drive system for a multi-phase brushless electric motor comprising a plurality of phases, the system comprising a drive circuit including switch means arranged to varying the phase voltage applied across each of the phases, and control means arranged to control the switch means so as to provide PWM control of the phase voltages to control the mechanical output of the motor, to control the PWM voltage patterns so as to include a test period, to measure a rate of change of current in at least one of the phases during the test period and to determine therefrom the inductance of at least one of the phases thereby to determine the rotational position of the motor.

Preferably the control means is arranged to define at least one pair of test periods such that the phase voltages in one of the pair of test periods are opposite to those in the other of the pair of test periods and the control means is arranged to determine from the current measured in the pair of test periods the inductance of one of the phases. This means that the test voltages have zero net effect, and the algorithm for determining the output producing voltages does not need to be significantly modified.

Normally, during any one PWM period, periods during which the voltages are reversed do not occur, since they will not add to the drive torque. Therefore it is normally necessary to add the test periods, as further periods within the PWM period in addition to the output producing periods when the voltages are producing the required output torque. The test periods will therefore normally occur between the output producing periods.

Preferably the pair of test periods are both provided in the same PWM period.

The control means may be arranged to measure the inductance of all of the phases in a single PWM period. In this case the control means is preferably arranged to switch the switching means to a number of conducting states during a number of output producing periods in a PWM period so as to produce a required motor output, and to a number of conducting states during said test periods, wherein the test periods are of sufficient length that the output producing periods and the test periods take up the whole of the PWM period.

Alternatively the control means may be arranged to measure the inductance of only some of the phases in a single PWM period, for example for a motor having three phases, the control means may be arranged to measure the inductance of only two of the phases in a single PWM period. In this case, for any position of the motor two pairs can be selected from the three phases for which the inductance can be measured so that the PWM period includes a non-conducting state, and the control means is preferably arranged to measure the inductance of one of the pairs in one PWM period and the other pair in a subsequent PWM period. Preferably the control means is arranged to alternate inductance measurement between said pairs of phases in successive PWM periods.

In a further alternative, the control means may be arranged to measure the inductance in only one of the phases in any one PWM period.

Preferably the control means is arranged to vary the phases or phases for which the inductance is measured so that, over a number of PWM periods, the inductance of all of the phases is measured.

Preferably the control means is arranged to provide a first PWM pattern in a first PWM period to allow inductance measurement of at least one phase and a second, different PWM pattern in a second PWM period to allow inductance measurement of at least one phase not measured in the first PWM period, and to produce at least one intermediate PWM pattern in a PWM period between the first and second periods, the intermediate pattern being intermediate in shape between the first and second patterns. This can help to reduce acoustic noise. The control means may need to be arranged not to measure the inductance of the phases in the intermediate PWM period.

Preferably the control means is arranged to determine the position of the motor in each PWM period. Conveniently the control means may be arranged to determine the position of the motor on the basis of the last measured value of inductance for each of the phases.

In some circumstances it is preferable for the control means to be arranged to determine the mean and peak values of the inductance of one of the phases as it oscillates during rotation of the motor, to measuring the instantaneous inductance of that phase, and to determine the position of the motor from the mean and peak and instantaneous values of the inductance. In this case it is preferable that, for all demanded voltages which can be produced from the same pair of primary voltages the inductance of the same two phases is measured, and when the demanded voltage changes so that a different pair of primary voltages are required and a different pair of inductances are measured, the latest measured values of the inductances of all of the phases are used to determine the mean and peak values of the inductance.

Preferably the system further comprises a single current sensor arranged to measure the current in the phases during the test periods. In this case the control means is preferably arranged to measure the magnitude of the current in two phases in each PWM period using the current sensor thereby to determine the current in all of the phases. Furthermore the test periods are preferably each sufficiently long to allow the magnitude of the current in one of the phases to be measured by the current sensor.

Alternatively, the system may include a plurality of current sensors, one for measuring the current in each of the phases.

For systems in which only one phase inductance is measured in each PWM period, the control means is preferably arranged to define a group of demanded voltages which could be produced by switching the switching means between two conducting states and the time required in at least one of the conducting states is insufficient to allow measurement of the magnitude of the current, and for those demanded voltages to add further test periods of zero net voltage and sufficient length to enable the magnitude of the current in one of the phases to be measured. Preferably the further test periods are only added in some PWM periods. More preferably the extra test periods are only added when the inductance measuring test periods and the output producing periods together do not provide sufficient time in each of two conducting states within one PWM period to allow the magnitude of the current in one of the phases to be measured.

Preferably the system includes a current sensor and a differentiator arranged to differentiate the output from the current sensor thereby to measure the phase inductances.

Other advantages of this invention will become apparent to those skilled in the art from the following detailed description of the preferred embodiment, when read in light of the accompanying drawings.

BRIEF DESCRIPTION OF THE DRAWING

FIG. 13a is a space vector diagram showing a further pattern of test voltages used for three-phase induction measurement in the system of FIG. 4;

FIG. 13b shows the phase voltages resulting from the pattern of FIG. 13a;

FIG. 13c is a table summarising the states resulting from the pattern of FIG. 13a;

FIG. 14a is a space vector diagram showing a further pattern of test voltages used for two-phase induction measurement in the system of FIG. 4, and FIG. 14b is a summary of the resulting states;

FIG. 15a is a space vector diagram showing a further pattern of test voltages used for two-phase induction measurement in the system of FIG. 4, and FIG. 15b is a summary of the resulting states;

FIG. 16a is a space vector diagram showing a further pattern of test voltages used for two-phase induction measurement in the system of FIG. 4, and FIG. 16b is a summary of the resulting states;

FIG. 17a is a space vector diagram showing a further pattern of test voltages used for single-phase induction measurement in the system of FIG. 4, and FIG. 17b is a summary of the resulting states;

FIG. 18a is a space vector diagram showing a further pattern of test voltages used for single-phase induction measurement in the system of FIG. 4, and FIG. 18b is a summary of the resulting states;

FIG. 19a is a space vector diagram showing a further pattern of test voltages used for single-phase induction measurement in the system of FIG. 4, and FIG. 19b is a summary of the resulting states;

FIGS. 24a to 24d show how changes in the PWM pattern are controlled in the two-phase inductance measurement method switching between the patterns of FIGS. 14a and 15a;

DETAILED DESCRIPTION OF THE INVENTION

Figure 3:
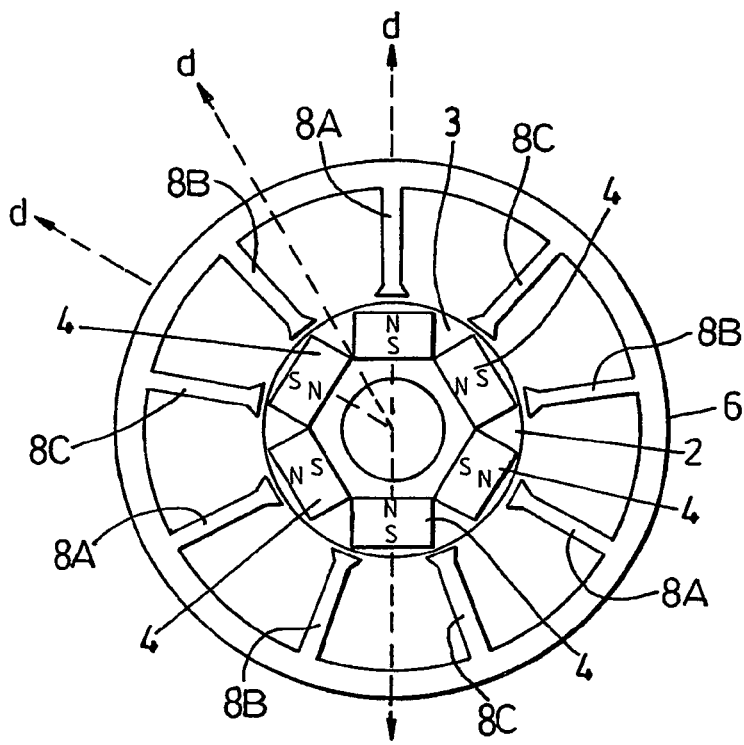
FIG. 3 is a diagram of an electric motor according to the invention.

Referring to FIG. 3 a three phase brushless motor 1 by way of example is provided which comprises a rotor 2 having for example six embedded magnets 4 within it which in this instance are arranged so as to provide six poles which alternate between north and south around the rotor. The rotor therefore defines three direct or d axes evenly spaced around the rotor and three quadrature or q axes interspaced between the d axes. The d axes are aligned with the magnetic poles of the magnets 4 where the lines of magnetic flux from the rotor are in the radial direction, and the q axes are spaced between the d axes where the lines of magnetic flux from the rotor are in the tangential direction.

A stator 6 comprises a nine slot copper wound element having three groups of three teeth 8A, 8B, 8C each group of teeth having a common winding forming a respective phase. There are therefore three electrical cycles in each full rotation of the rotor, and the three teeth 8A, 8B, 8C in any phase are always in the same electrical position as each other.

Figure 2:
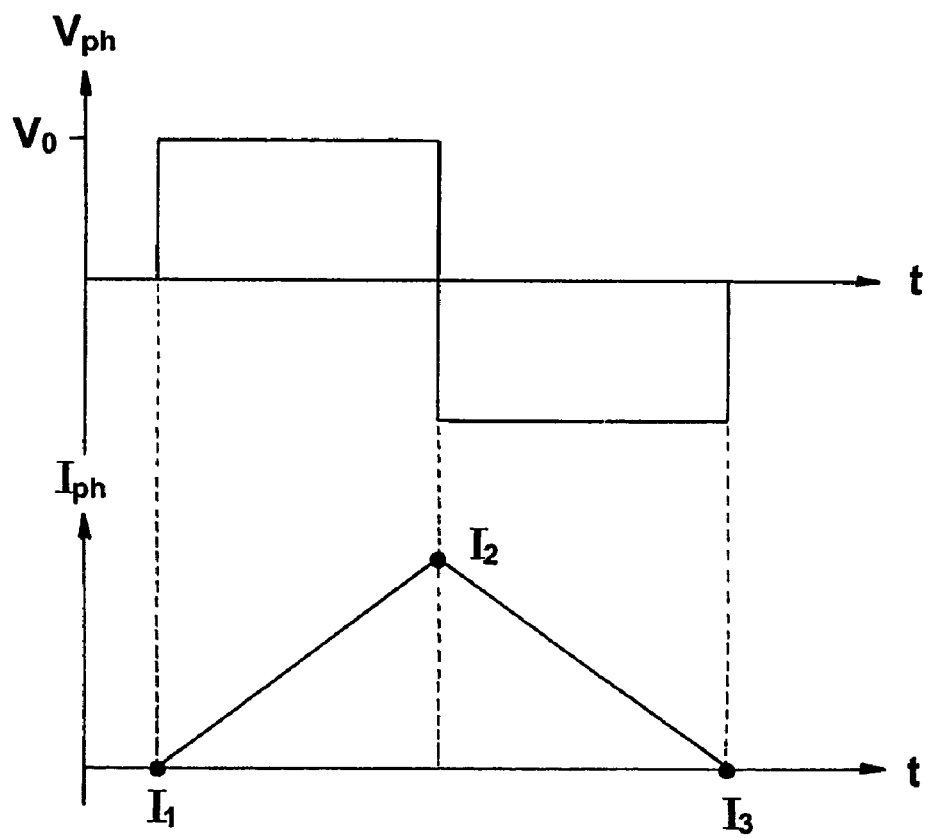
FIG. 2 shows a known voltage waveform used to measure the inductance of one phase of an electric motor.

Referring to FIG. 2, the three motor windings 12, 14, 16, generally designated as phases A, B and C, are connected in a star network. The phase windings are coiled around the stator teeth 8A, 8B, 8C respectively. One end 12a, 14a, 16a of each coil is connected to a respective terminal 12c, 14c, 16c. The other ends 12b, 14b, 16b, of the coils are connected together to form the star centre 17. A drive circuit comprises a three phase bridge 18. Each arm 20, 22, 24 of the bridge comprises a pair of switches in the form of a top transistor 26 and a bottom transistor 28 connected in series between a supply rail 30 and ground line 32. The motor windings 12, 14, 16 are each tapped off from between a respective complementary pair of transistors 26, 28. The transistors 26, 28 are turned on and off in a controlled manner by a controller 33 to provide pulse width modulation of the potential applied to each of the terminals 12c, 14c, 16c, thereby to control the potential difference applied across each of the windings 12, 14, 16 and hence also the current flowing through the windings. This in turn controls the strength and orientation of the magnetic field produced by the windings.

A current measuring device in the form of a resistor 34 is provided in the ground line 32 between the motor 1 and ground so that the controller 33 can measure the total current flowing though all of the windings 12, 14, 16. In order to measure the current in each of the windings the total current has to be sampled at precise instants within the PWM period where the voltage applied to each terminal of the winding (and hence the conduction state of a particular phase) is known. A further sensor 36 which is a di/dt sensor arranged to measure rate of change of current is provided in the ground line 32 in series with the current sensor 34. The di/dt sensor 36 is used to measure the inductance of the phases, and hence the position of the rotor as will be described below.

It will be appreciated from FIG. 3 that the inductance of the rotor 2 varies with electrical position because the air gap between the stator iron and rotor back iron varies with position, resulting in a variation of stator flux reluctance with rotor position. The variation of inductance for each of the three phases A, B, C is shown in FIG. 5.

Figure 7:
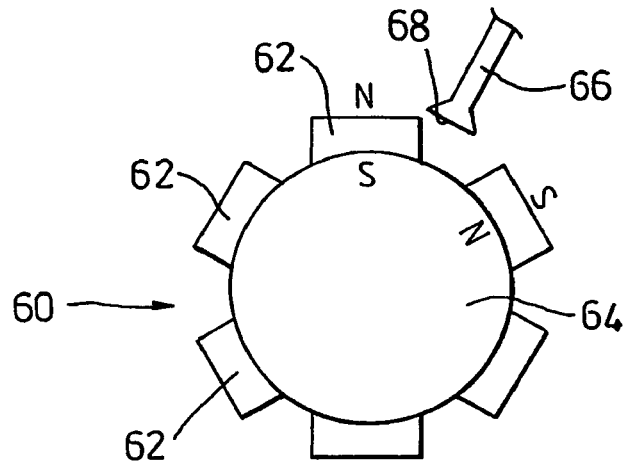
FIG. 7 shows an external magnet rotor according to a further embodiment of the invention.

Referring to FIG. 7, in a surface magnet rotor 60 the magnets 62 are mounted on the surface of the rotor core 64 and there is therefore very little or no rotor saliency to generate variation in inductance with rotor position. However, as one of the magnets 62 passes a stator tooth 66, localised magnetic saturation occurs in the stator tooth near the corners 70 of the magnets which alters the inductance of the stator windings. This therefore produces a regular variation in inductance with position which can be used in the same way as that arising in internal magnet rotors as described above to determine rotor position.

Because there is a predictable and consistent variation of phase inductance with rotor position, the rotor position can be determined accurately from knowledge of the phase inductances. In a permanent magnet (PM) motor the inductance for a particular phase is generally highest when the q-axis is aligned with the phase, and lowest when the d-axis is aligned with the phase. Consequently, the inductance varies at twice the electrical frequency, and so the phase inductance equations will yield two possible rotor positions, 180 electrical degrees apart. The system needs to determine which of these two positions is the correct one. One suitable method is to determine the magnetic polarity at start-up by applying large positive and negative test currents, and comparing the effect of localised magnetic saturation on the resulting inductance measurements. Once this procedure has been carried out once, the magnetic polarity is known and the rotor position can always be determined uniquely.

Figure 5:
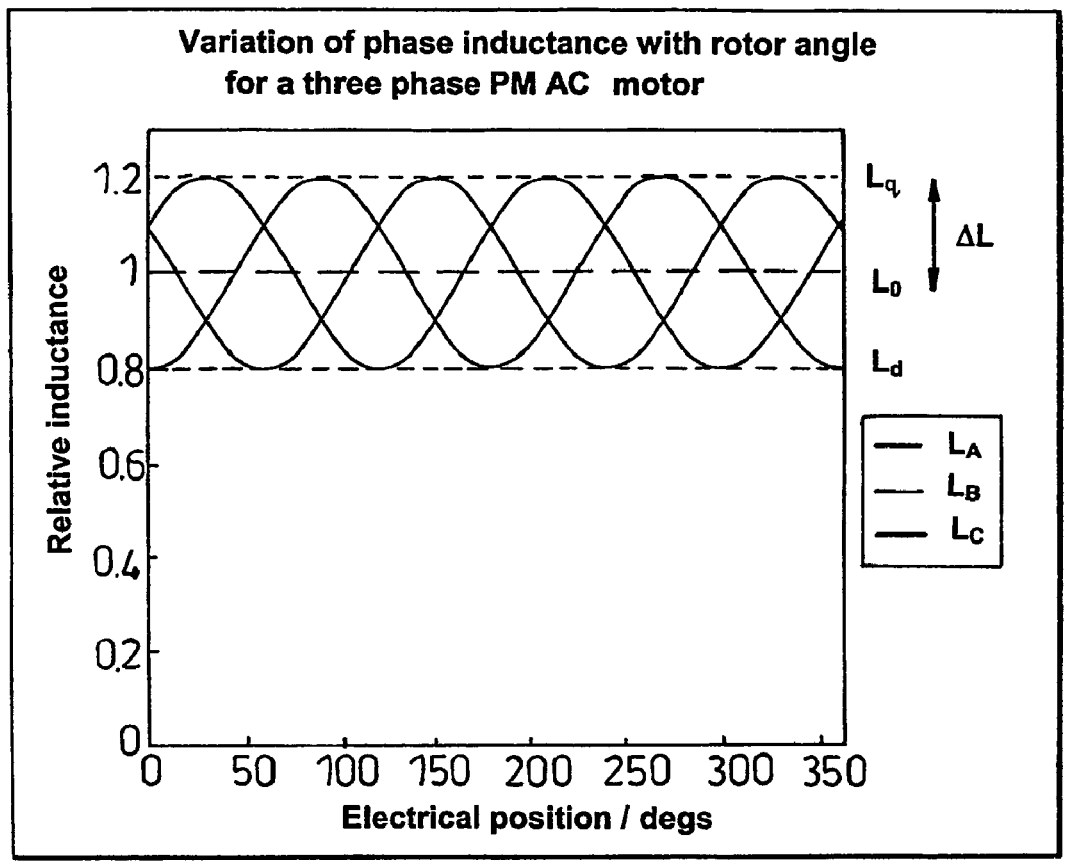
FIG. 5 shows the variation of phase inductance with rotor angle in the motor of FIG. 1.

The model for the motor shown in FIG. 5 assumes that phase inductance varies sinusoidally with position from its maximum value $L_q$ to its minimum value $L_d$. $L_d$ and $L_q$ represent the phase inductances when the direct and quadrature rotor axes respectively are aligned with the stator axis of the phase being measured.

The inductance variation shown in FIG. 5 can be represented in complex co-ordinates as the sum of two contra-rotating vectors of length $L_0$ and $\Delta L$, where $L_0$ is the average inductance and $\Delta L$ is half the peak-to-peak variation of inductance over one revolution, i.e. the amplitude of the variation in inductance. For $L_0 > \Delta L$, they are defined as:

$$L_0 = \frac{L_q + L_d}{2} \quad (1a), (1b)$$
$$\Delta L = \frac{L_q - L_d}{2}$$

The inductance at a given rotor angle, $L(\theta)$, is the real part of the sum of the two complex contra-rotating vectors, i.e.

$$L(\theta) = Re\{L_0 e^{j\theta} - \Delta L e^{-j\theta}\} \quad (2)$$

Which may be rearranged to yield $$L(\theta) = Re\{L_0 - \Delta L e^{-2j\theta}\} \quad (3)$$

The phase inductance measured at the three phases A, B and C is therefore $$L_A(\theta) = Re\{L_0 - \Delta L e^{-2j\theta}\}$$
$$L_B(\theta) = Re\{L_0 - \Delta L e^{-2j[\theta - 2\pi/3]}\}$$
$$L_C(\theta) = Re\{L_0 - L e^{-2j[\theta - 4\pi/3]}\} \quad (4)$$

which can be re-written as:

$$L_A(\theta) = L_0 - \Delta L \cos(2\theta)$$
$$L_B(\theta) = L_0 - \Delta L \cos(2[\theta - 2\pi/3])$$
$$L_C(\theta) = L_0 - \Delta L \cos(2[\theta - 4\pi/3]) \quad (5a)-(5c)$$

This relationship is illustrated in FIG. 5. If the three phase inductances are known, the three unknown variables, rotor angle $\theta$, mean inductance $L_0$, and peak inductance $\Delta L$ can now be determined.

$L_0$ can be found from:

$$L_0 = \frac{L_A(\theta) + L_B(\theta) + L_C(\theta)}{3} \quad (6)$$

$\Delta L$ and $\theta$ can be found by first applying the Parkes transform to calculate the $\alpha$ and $\beta$ frame inductances:

$$\begin{bmatrix} L_\alpha(\theta) \\ L_\beta(\theta) \end{bmatrix} = \frac{2}{3} \begin{bmatrix} 1 & \cos(2\pi/3) & \cos(4\pi/3) \\ 0 & \sin(2\pi/3) & \sin(4\pi/3) \end{bmatrix} \begin{bmatrix} L_A(\theta) \\ L_B(\theta) \\ L_C(\theta) \end{bmatrix} \quad (7)$$

$\Delta L$ is then:

$$\Delta L = \sqrt{L_\alpha^2(\theta) + L_\beta^2(\theta)} \quad (8)$$

and $\theta$:

$$\theta = -\frac{1}{2}\left[\tan^{-1}\left(\frac{L_\beta}{L_\alpha}\right) - \pi\right] + n\pi \quad (9)$$

Where n is an arbitrary integer which appears because the angle cannot be determined uniquely and which can be determined using the start-up routine described above.

Determining Phase Inductance Online

The phase inductance is determined by measuring the rates of change of current in the phase in response to a positive and a negative test voltage. This is a robust technique as it eliminates the back emf term from the system equations, which if not eliminated would be difficult to determine accurately and could lead to measurement errors.

To determine the inductance of one phase the following steps are taken:

1. Apply a positive voltage, +V, to the phase for sufficient time to determine the rising rate of change of current, $di_1/dt$.
2. Apply a negative voltage, -V, to the phase for sufficient time to determine the falling rate of change of current, $di_2/dt$.

Figure 6:
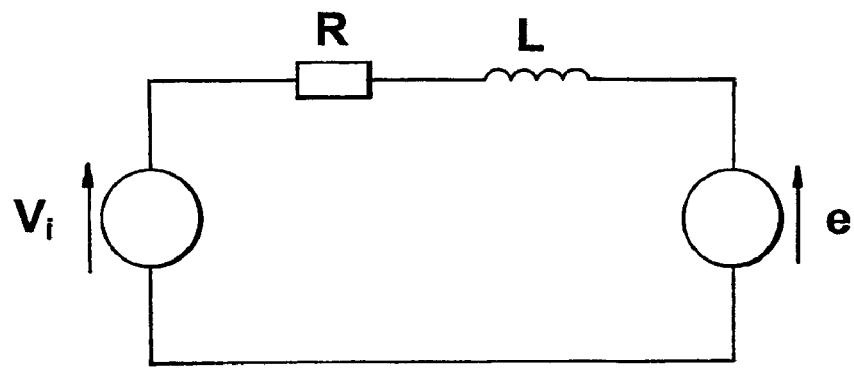
FIG. 6 shows a simplified circuit model of one of the phases of the motor of FIG. 1.

FIG. 6 shows a simplified circuit model of one phase of the drive, incorporating the applied voltage, V(t), the phase inductance, $L_{ph}$, and the motor back-emf, e.

When the positive test voltage is applied:

$$+V - e = L_{ph}\frac{di_1}{dt} + Ri_1 \quad (10)$$

When the negative test voltage is applied:

$$-V - e = L_{ph}\frac{di_2}{dt} + Ri_2 \quad (11)$$

Since the average values of the currents $i_1$ and $i_2$ will be practically identical over the sample period, and since their difference $(i_1 - i_2)$ is small, the resistance part can be neglected. Hence by subtracting (11) from (10) and rearranging, the phase inductance becomes:

$$L_{ph} = \frac{\frac{di_1}{dt} - \frac{di_2}{dt}}{2V} \quad (12)$$

Hence, the instantaneous phase inductance is determined solely from the applied voltages and measured rates of change of current.

The controller 33 is arranged to control the voltages applied to the phases A,B,C using pulse width modulation (PWM) to control the output torque of the motor as will now be described.

Figure 8:
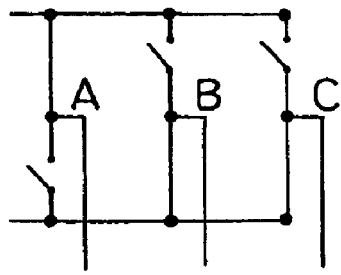
FIG. 8 shows the eight states of the control circuit of the system of FIG. 4.
Figure 8:
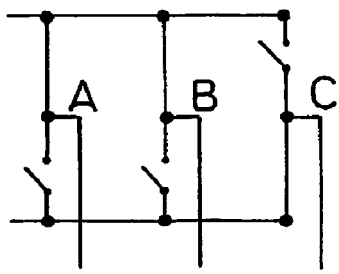
Figure 8:
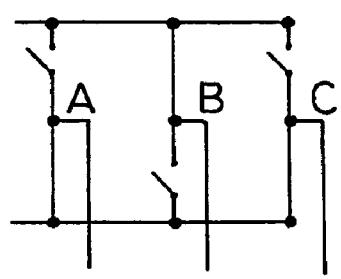
Figure 8:
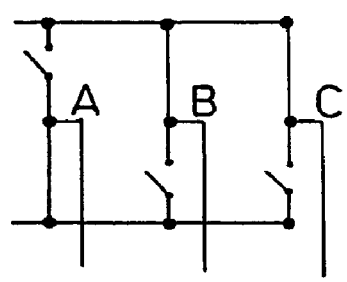
Figure 8:
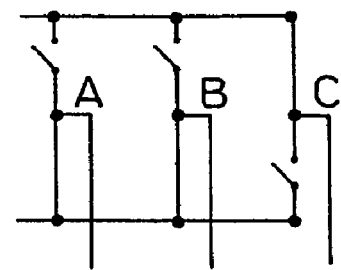
Figure 8:
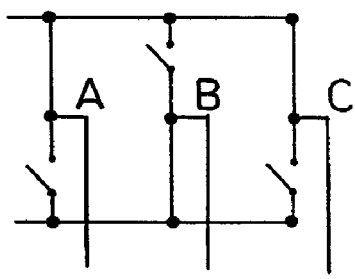
Figure 8:
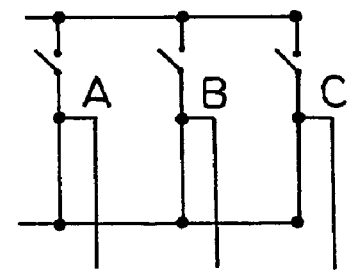
Figure 8:
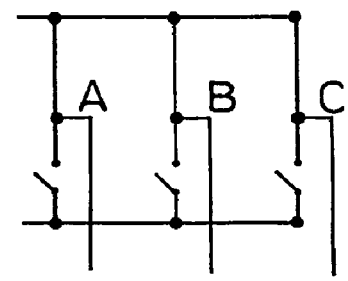

Referring to FIG. 8, each winding 2, 4, 6 in a three phase system can only be connected to either the supply rail 20 or the ground line 22 and there are therefore eight possible states of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

States 1, 2, 3, 4, 5 and 6 are herein also referred to as states +A, −C, +B, −A, +C and −B respectively, because they each represent the states in which the voltage applied across the windings is in a positive or negative direction for a respective one of the phases. For example in the +A state the A phase is connected to the supply rail and the other two phases are connected to the ground link, and in the −A state the connections are reversed.

When the circuit is being controlled to produce pulse width modulation, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time can be calculated by various modulation algorithms but in this embodiment a space vector modulation technique is used.

Applying the Voltage Test Patterns

Voltage test patterns that incorporate the positive and negative inductance measurement voltages across each of the phases are incorporated into the three-phase PWM waveform by inserting extra non-zero states into the applied PWM voltage pattern. This technique is conveniently described here using Space Vector Modulation (SVM), although any PWM modulation scheme could be adapted to implement the technique.

Figure 9:
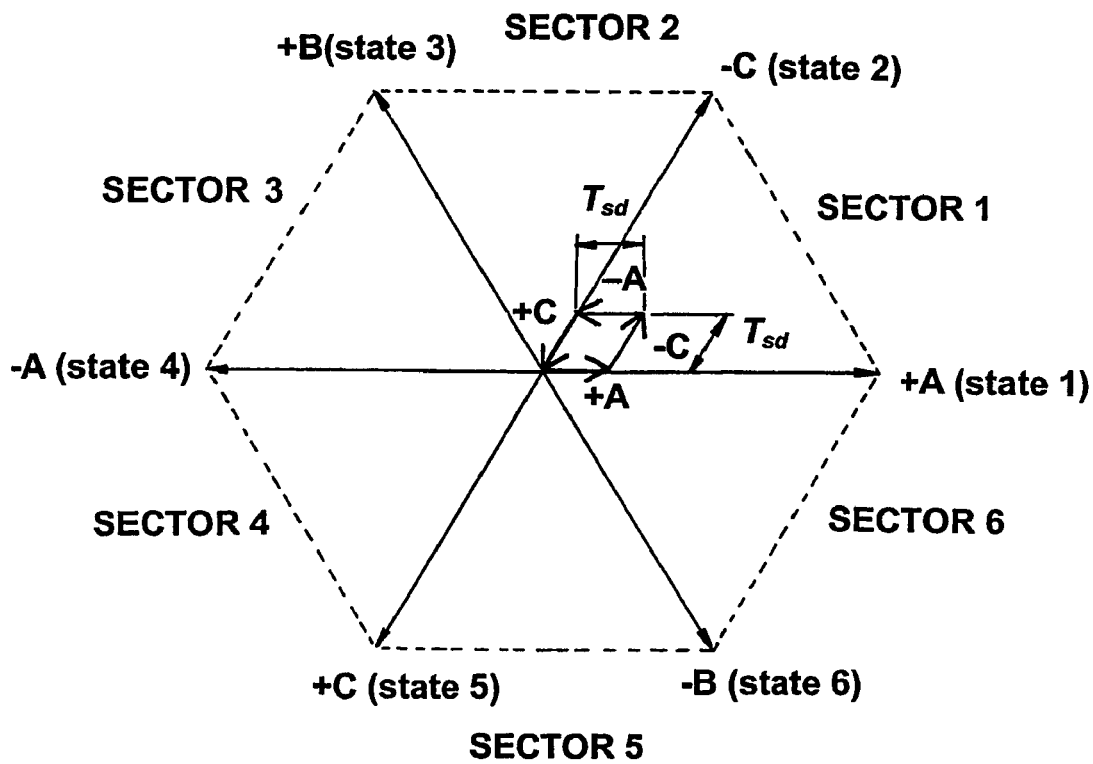
FIG. 9 is a space vector diagram showing a pattern of test voltages used in the system of FIG. 4.

Referring to FIG. 9, in state vector modulation systems, the times in each PWM period spent in each of the states are represented as state vectors in a state vector modulation (SVM) diagram. In this type of diagram, single state vectors are those in the directions of the vectors s1 to s6, and the length of the vectors in each of these directions represents the amount of time in each PWM period spent in the respective state. This means that any desired voltage in the windings can be represented as a point on the diagram which corresponds to a voltage vector which represents the magnitude and direction of the voltage, and can be produced by a combination of state vectors s1, s2, etc. the length of which represent the time in each PWM period spent in that state.

A Typical Test Pattern

An example of test vectors, which represent the test voltages applied to the windings, is shown in FIG. 9. Here two pairs of test vectors are applied which enables the inductance in two phases (A and C in this case) to be measured simultaneously, i.e. in the same PWM period. It can be seen that the pattern consists of a positive and negative phase A vector and a positive and negative phase C vector. It will be appreciated that, provided these vectors are the same length, i.e. the time spent in each of states 1 and 4 and in each of states 2 and 5 is the same, the net voltage from the test vectors will be zero.

To measure the rate of change of current, a finite time is required for the sensors and associated circuitry to settle, and the reading to be taken. The minimum time required to measure the rate of change of phase current (di/dt) is herein defined as $T_{sd}$. Therefore each of the vectors must be of minimum length $T_{sd}$ as illustrated in FIG. 9.

In order to keep $T_{sd}$ as small as possible, a separate rate of change of current (di/dt) sensor 36 is used as described above. This enables the rate of change of current to be determined in a single reading, whereas a current sensor would have to be sampled twice to obtain this information.

It can be seen that the test vectors shown in FIG. 9 will also allow the phase currents to be measured using the single current sensor 34 in the ground return of the DC link. The minimum state time required to measure the current in a single sensor system is herein defined as $T_{si}$, and to determine the currents in all three phases, the currents in at least two conducting states, which are not opposites of each other, need to be measured. Therefore providing there are two non-zero vectors from two phases of minimum length $T_{si}$, the phase currents can be determined in a single PWM period.

Figure 10:
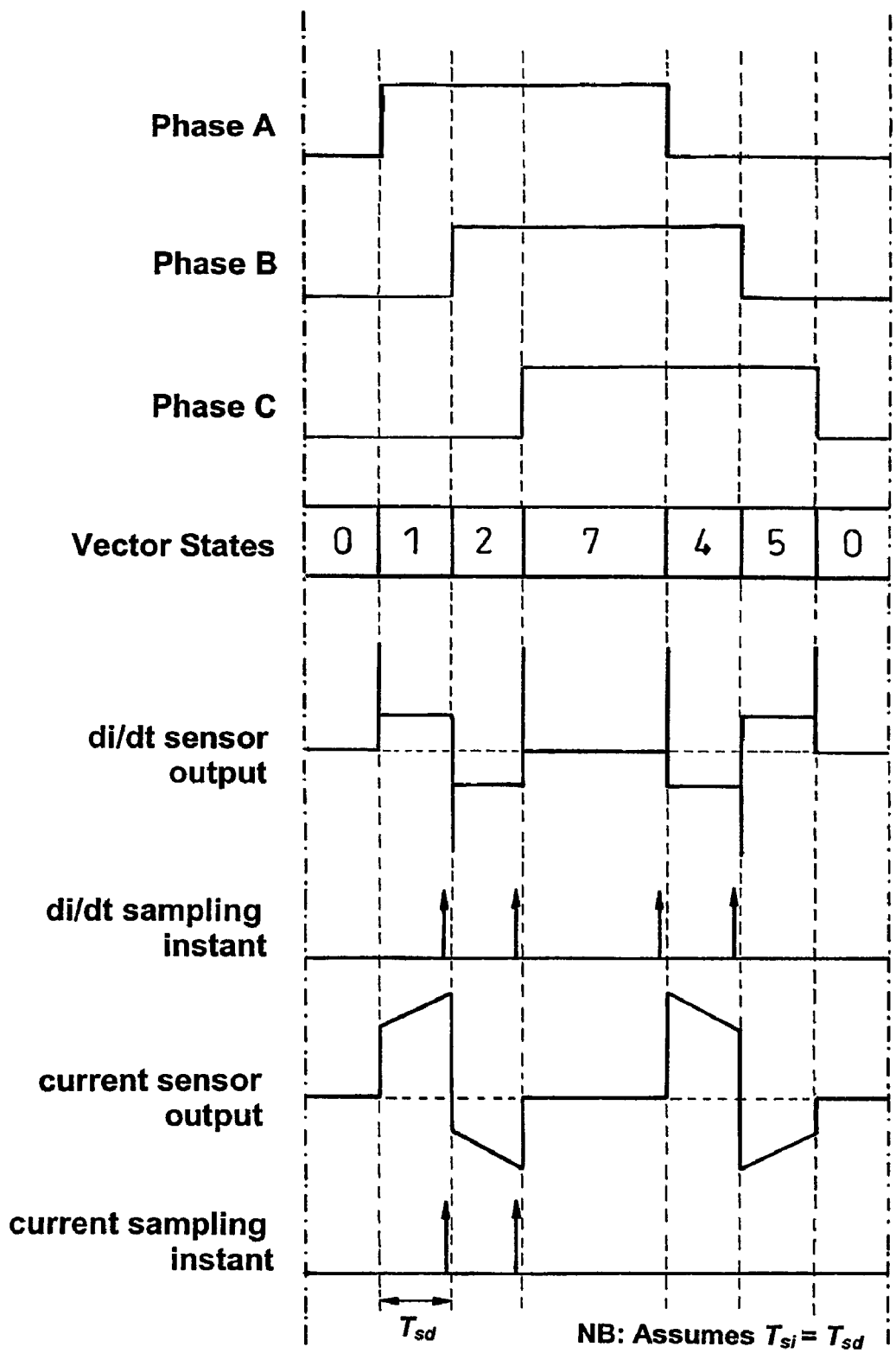
FIG. 10 shows the phase voltages and sensor outputs resulting from the test voltage pattern of FIG. 9

FIG. 10 shows a typical PWM pattern for realising the state vectors of FIG. 9. Typical outputs that would be expected for the link-return current sensor 34 and a link-return di/dt sensor 36 are also shown. All phase voltages go high-low-high. There are three periods of non-conducting states, two in state 0 and one in state 7, and four conducting states 1, 2, 4 and 5. During the conducting states the rate of change of current di/dt is substantially constant as the current rises at a constant rate. The current magnitude sensor di/dt sensor sample points are towards the end of the respective conducting state periods in which they are made to allow the current to settle after the switch between states.

Combining the Test Pattern with the Applied Voltage Vector

FIGS. 9 and 10 show test voltage vectors being applied for a modulation index of zero. For modulation indices greater than zero, the test vectors must be superposed onto the phase current-producing voltage demand vectors, which are calculated to produce the desired output torque from the motor. A typical example of this is shown in the space vector diagram of FIG. 11. The demanded state vector v is made up of two primary state vectors +A and −C, and the four test period vectors are each of length $T_{sd}$. Typical PWM patterns and sensor outputs for this case are shown in FIG. 12.

Figure 11:
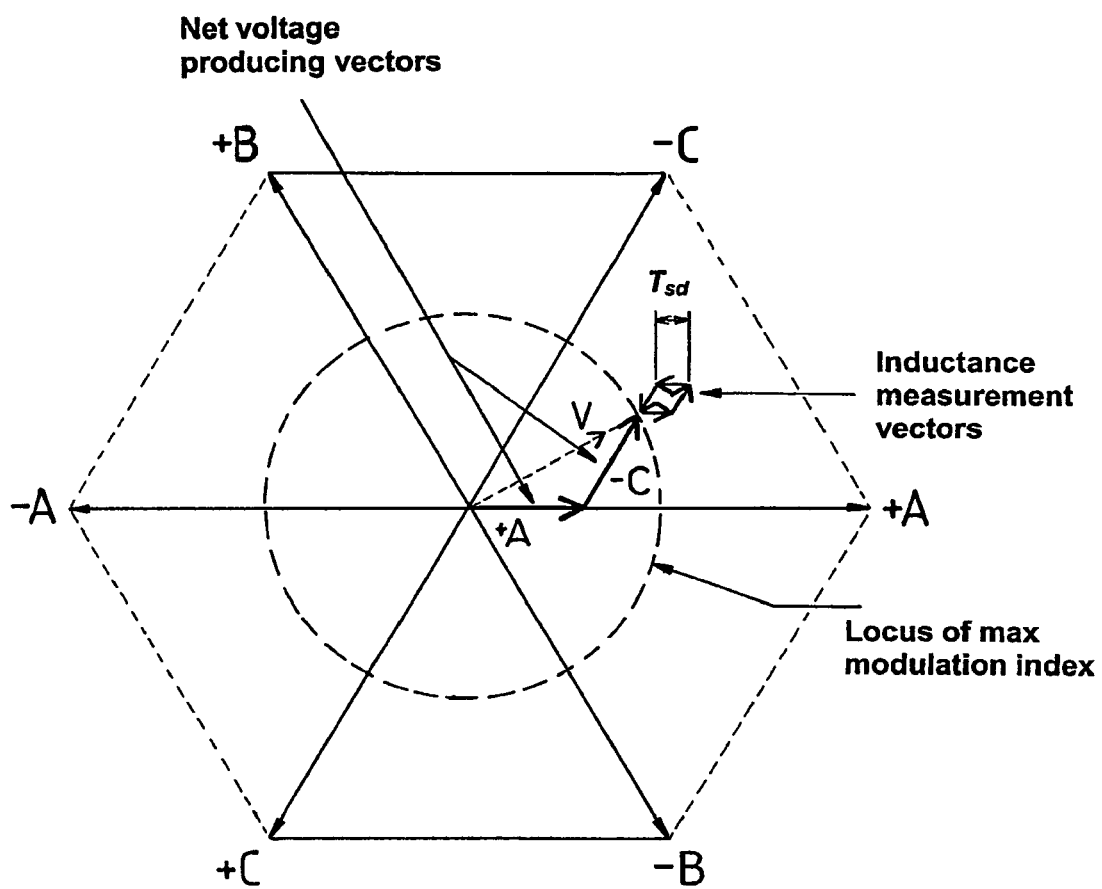
FIG. 11 is a space vector diagram showing a further pattern of test voltages used in the system of FIG. 4.

It can be seen from FIG. 11 that superposing the test vectors onto the demand vectors reduces the time available in the PWM period for producing 'useful' voltage by $4T_{sd}$.

Analysis of Different Types of Test Vector Patterns

Figure 12:
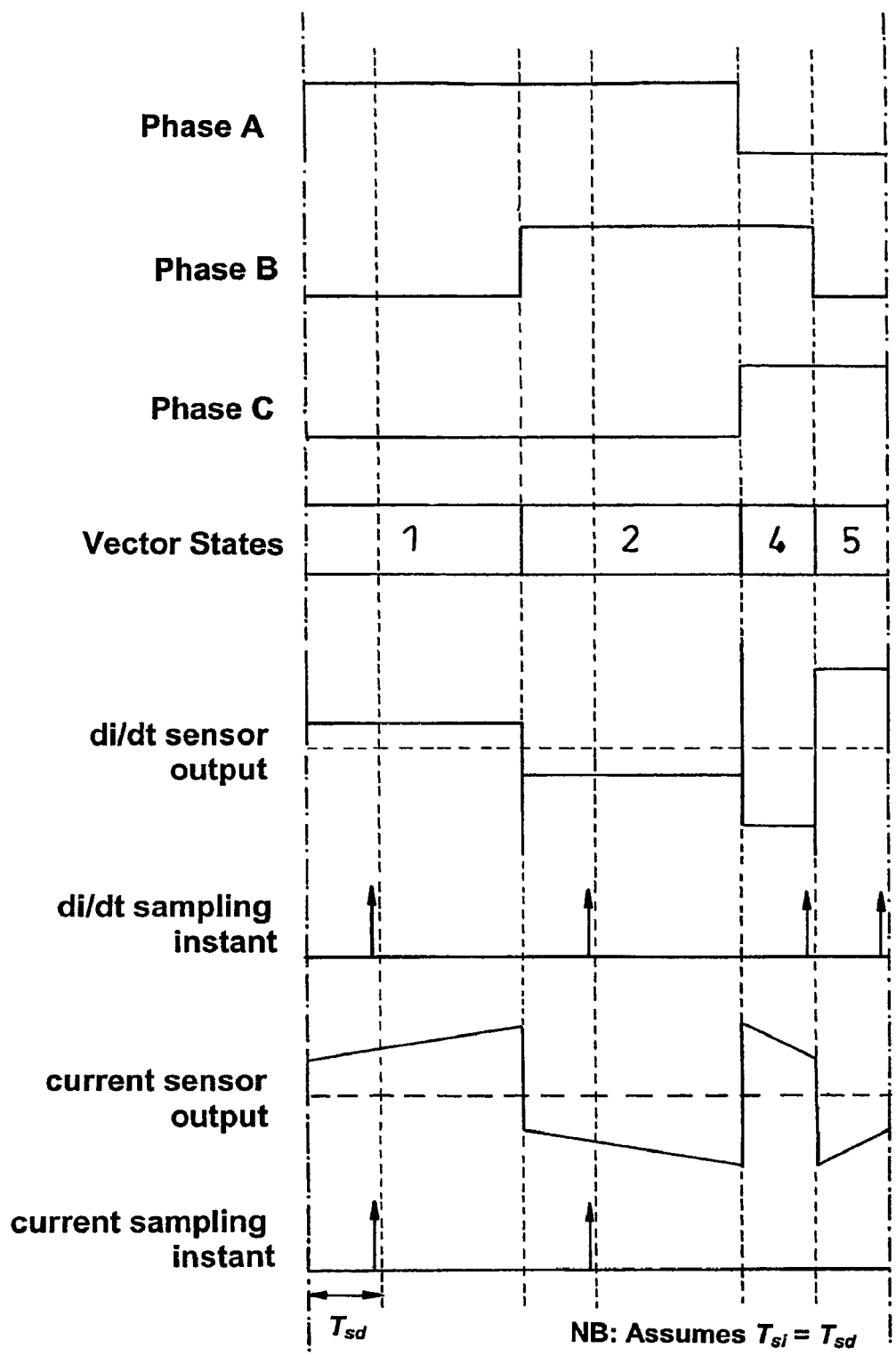
FIG. 12 shows the phase voltages and sensor outputs resulting from the test voltage pattern of FIG. 11.

The examples of FIGS. 11 and 12 show how it is possible to adapt the normal PWM waveform to measure two phase inductances simultaneously, i.e. in the same PWM period. However, the PWM waveform can be adapted to measure one, two or three inductances simultaneously, with different consequences for each.

Test Vector Patterns to Measure Three Inductances Simultaneously

FIG. 13a shows the test vectors required to measure all three inductances simultaneously. The demand voltage is again made up of two vectors +A and −C, and there are six test voltage vectors each of length $T_{sd}$, the six test vectors comprising one each of the six primary vectors +A, −A, +B, −B, +C, −C and produce a net voltage of zero. Clearly, as all six non-zero vectors are needed, the available time for generating useful voltage is reduced by $6T_{sd}$.

FIG. 13b shows a typical PWM pattern over one PWM period for realising these vectors, and FIG. 13c shows the corresponding state summary. It can be seen that the PWM pattern has two unusual features. Firstly, it is not possible to apply zero-voltage state vectors, so the zero voltage states have to be replaced by increasing the size of each of the test vectors, each pair of opposite test vectors being kept of equal length so as to retain their net value of zero. Secondly, the operation of one of the phases must be the inverse of the other two. In other words, the state of the high-side transistors for two of the phases will go low-high-low in a PWM period, but the third phase they will go high-low-high. Although both of these features are unusual, they are physically possible and it should be possible to realise them in a practical system.

Assuming the ideal case with zero dead time, it can be shown that the maximum modulation index $m_{max}$, defined herein as the ratio of the peak phase voltage fundamental to half of the DC link voltage, that can be applied whilst still measuring the instantaneous phase inductance in three phases is $$m_{max} = \frac{2}{\sqrt{3}}\left[1 - \frac{6T_{sd}}{T_p}\right] \quad (15)$$

where $T_p$ is the PWM period.

For a typical system where $T_{sd}$ and $T_{st}$ are 10% of the PWM period $T_p$ this would give a maximum theoretical modulation index of 0.46. Obviously in the real case the effects of interlock delays (dead times) would have to be accounted for which would reduce this number somewhat.

The main advantage of the three-phase inductance measurement approach is that it enables the rotor position to be determined exactly each PWM period. The main drawbacks are that it severely limits the maximum modulation index, and that it produces a very unusual PWM pattern.

Test Vector Patterns to Measure Two Inductances Simultaneously

Two-phase measurement patterns (such as the one described above with reference to FIG. 11) reduce the amount of time wasted on producing the test pattern to $4T_{sd}$. Since only two phases are measured in a single PWM period, there are three different combinations of pairs of vectors that can be measured. Each combination will result in three different types of patterns, depending on which sector of the SVM vector space that the voltage demand lies. Some patterns are easier to realise than others.

FIG. 14a shows pattern I for sector 1 of the state vector diagram, and FIG. 14b is the corresponding state summary. This comprises four non-zero state vectors and is the natural pattern for a particular sector as it is comprised only of the two principal state vectors for that sector and their inverses.

FIG. 14b shows pattern II. This comprises five non-zero state vectors and includes states from adjacent sectors. Unlike pattern I, zero-state vector seven cannot be used, but since zero-state vector zero can be realised, this should not present any real implementation problems.

FIG. 14c shows pattern III. This also comprises of five non-zero state vectors, but this time the only zero-state vector available is vector seven. The main problem with this pattern is that, as with the pattern for measuring three phase inductances, one phase of the resulting PWM waveform must go high-low-high, rather than low-high-low.

A practical solution is to use patterns I and II only. By rapidly alternating between the two patterns, all three of the phase inductances can be determined. Table 1 shows which pattern should be selected for which phase measurement in each sector of the state vector diagram, the sectors being as shown in FIG. 9.

TABLE 1

| Sector | 1 | 2 | 3 | 4 | 5 | 6 |
|---|---|---|---|---|---|---|
| Pattern I | AC | BC | AB | AC | BC | AB |
| Pattern II | BC | AC | AC | AB | AB | BC |

The maximum modulation index, assuming zero interlock-delay, for two phase inductance measurements with any pattern is $$m_{max} = \frac{2}{\sqrt{3}}\left[1 - \frac{4T_{sd}}{T_p}\right] \quad (16)$$

For the typical system described above where $T_{sd}$ and $T_{st}$ are 10% of the PWM period $T_p$ this gives a maximum modulation index of 0.69.

The two-inductance measurement technique significantly increases the maximum modulation index available. The PWM patterns produced are very similar to standard single current-sensor patterns, and are relatively easy to produce. By rapidly switching between patterns I and II, all three phase inductances can be determined. Furthermore, it may be possible to exploit the redundancy arising from the fact that one phase is measured twice to improve the accuracy of the position estimate.

Test Vector Patterns to Measure One Inductance

FIGS. 17a and 17b are a state vector diagram and state summary for measuring the inductance in only one phase, phase A in sector 1 of the vector space. FIGS. 18a and 18b are the corresponding diagrams for phase B and FIGS. 19a and 19b for state C. For phases A and C, the inductance can be measured without any restrictions to the PWM pattern. For phase B however, the pattern cannot incorporate the zero-state space vector seven, but again this should not present any major implementation problems. In general, for a given sector, the pattern required for measuring the inductance of the phase whose positive or negative vectors do not lie adjacent to that sector will not incorporate state vector seven.

Figure 20:
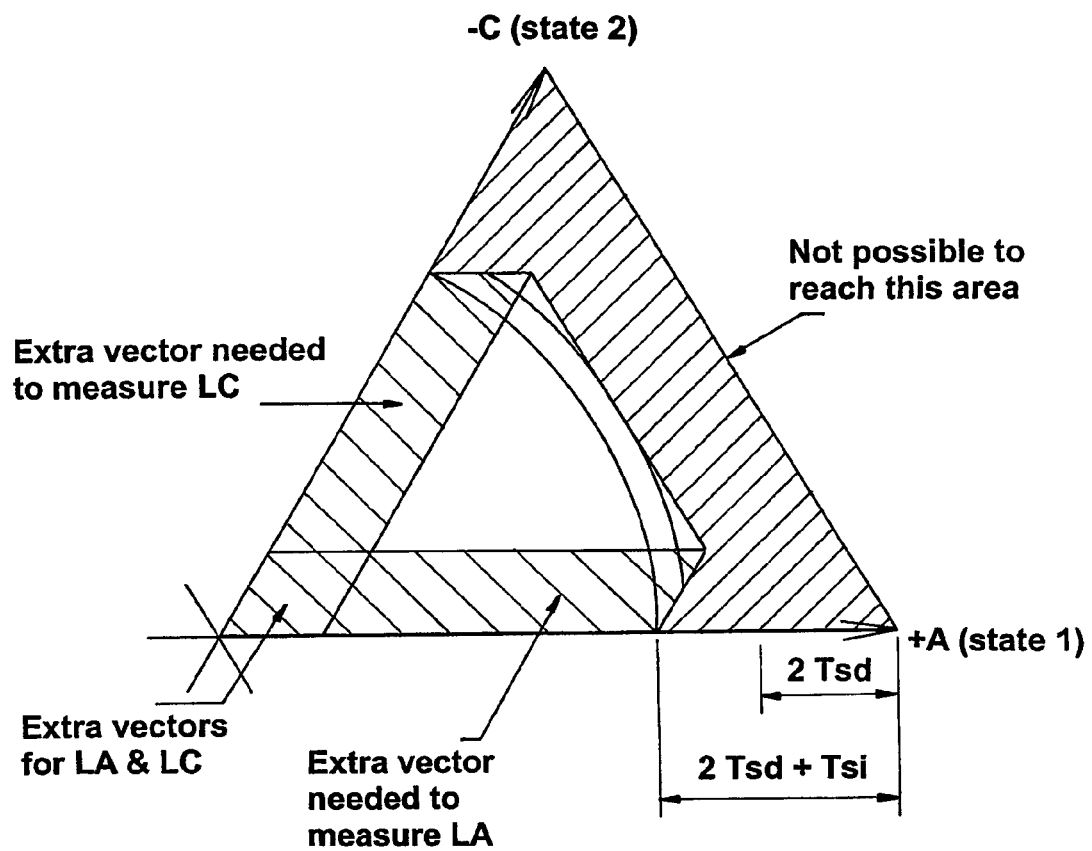
FIG. 20 shows areas of the space vector diagram where inductance and current sensing require the addition of further voltage vectors in the two-phase induction measurement arrangement.

Since the test patterns only incorporate test vectors for one phase, it is no longer possible to guarantee that there will be enough time in the PWM waveform to measure two phase currents. For example if in the example of FIG. 17a the –C vector were less than $T_{si}$ then only the current in phase A could be measured during any PWM period in which the inductance of phase A was being measured. Referring to FIGS. 18a and 19a, while the inductances of phases B and C are being measured, provided the vector +A is longer than $T_{st}$ then two phase currents can be measured. Hence, in order to carry out single current sensor current measurement successfully it is necessary in certain regions of the sector to add an extra test vector of length $T_{st}$ to incorporate sufficient time to measure one of the two phase currents required single current sensing. The regions where this is applicable are shown in FIG. 20. It can be seen that for areas within $T_{si}$ of the +A or –A primary vector, extra test vectors will be needed when measuring the inductance of phase A, for areas within $T_{st}$ of the +B or –B primary vector, extra test vectors will be needed when measuring the inductance of phase B, and for areas within $T_{si}$ of the +C or –C primary vector, extra test vectors will be needed when measuring the inductance of phase C. For areas close to the centre of the phase diagram which are within $T_{si}$ of two state vectors, extra test vectors will be required to measure two of the inductances while maintaining full single sensor current measurement.

FIG. 20 also shows the limit of operation for test vector patterns that enable one phase inductance and two phase currents to be measured simultaneously. The maximum modulation index for zero interlock delays is therefore $$m_{max} = \min\left\{\frac{2}{\sqrt{3}}\left[1 - \frac{2T_{sd}}{T_p}\right], \frac{4}{3}\left[1 - \frac{T_{si} + 2T_{sd}}{T_p}\right]\right\} \quad (16)$$

where the function min{x, y} returns the whichever is the smaller out of x and y.

For the typical system described above where $T_{sd}$ and $T_{si}$ are 10% of the PWM period $T_p$ the maximum modulation index would be min{0.92, 0.93}=0.93.

The maximum modulation index could be increased either by not measuring the second phase current or by not measuring the inductance in the regions where an extra test vector would be needed. However, as the above result shows, the addition of extra test vector does not significantly reduce the maximum modulation index for practical implementations.

The single-phase inductance measurement scheme gives the highest maximum modulation index, and so operates up to the highest speed. It generally yields slightly worse accuracy and dynamic response of the position estimate than with the two-phase approach, but providing sample rate is high, this is not particularly noticeable.

Methods for Determining the Position

Once the inductances of the phases are known, the rotor position can be determined by solving equations (5 (a)–(c)). When all three phase-inductances are measured simultaneously, this process is straightforward. However, when only two or one of the inductances can be measured at a time, it is necessary to combine old and new inductance measurements to determine the position. The way in which these measurements are combined will affect the accuracy and dynamic characteristics of the position signal.

Determining position from Three Simultaneous Inductance Measurements

When all three phase inductances are measured simultaneously, the rotor position can be determined directly by solving the simultaneous equations (5(a)–(c)). This approach should give the position signal with the highest bandwidth and greatest accuracy.

Determining position from Consecutive Inductance Measurements

Figure 21:
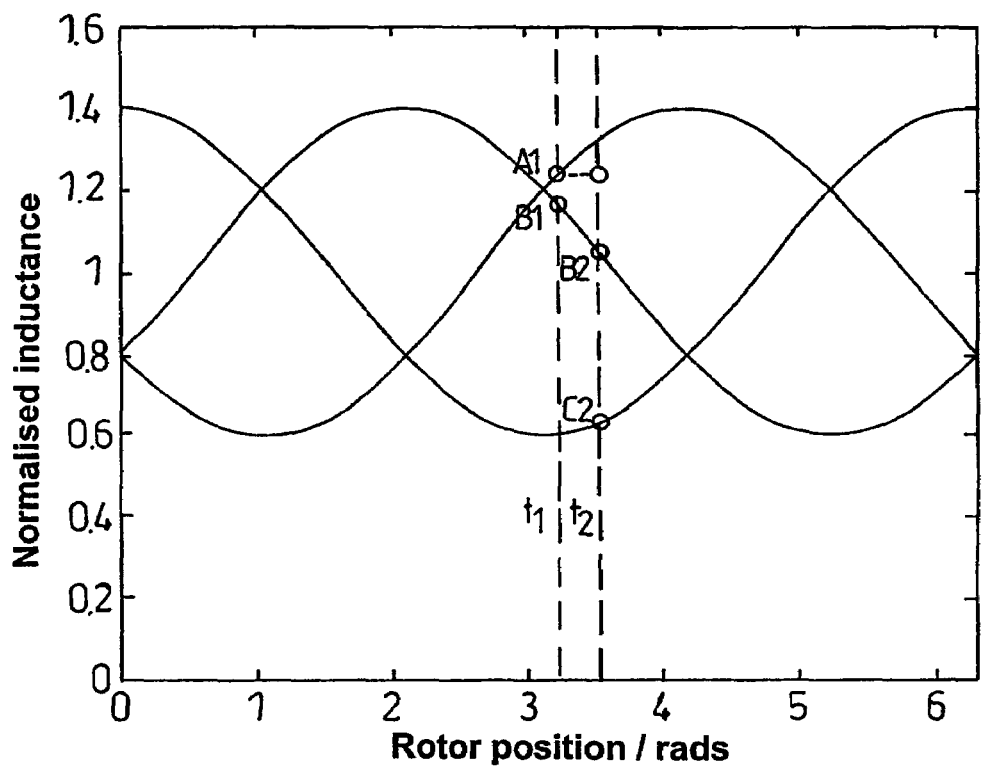
FIG. 21 shows a method of measuring rotor position in the system of FIG. 4.

When the only one or two inductances are measured in each PWM period, the position can be estimated by using older inductance measurements for the phases that have not been measured at that sample-time. FIG. 21 shows the situation where the inductances are measured in pairs. At time $t_2$ the position can be determined by using the current value of the B and C phase inductances (LB2 and LC2) and the value of the phase A inductance from the previous sample (LA1) in the previous PWM period at time $t_1$. Since the old phase A inductance is being extrapolated forward in time, there will be a slight error in the computed position. However, if the angle travelled by the rotor, $\Delta\theta$, during one sample time, $\Delta t$, is small the position error will be also be small.

Figure 23:
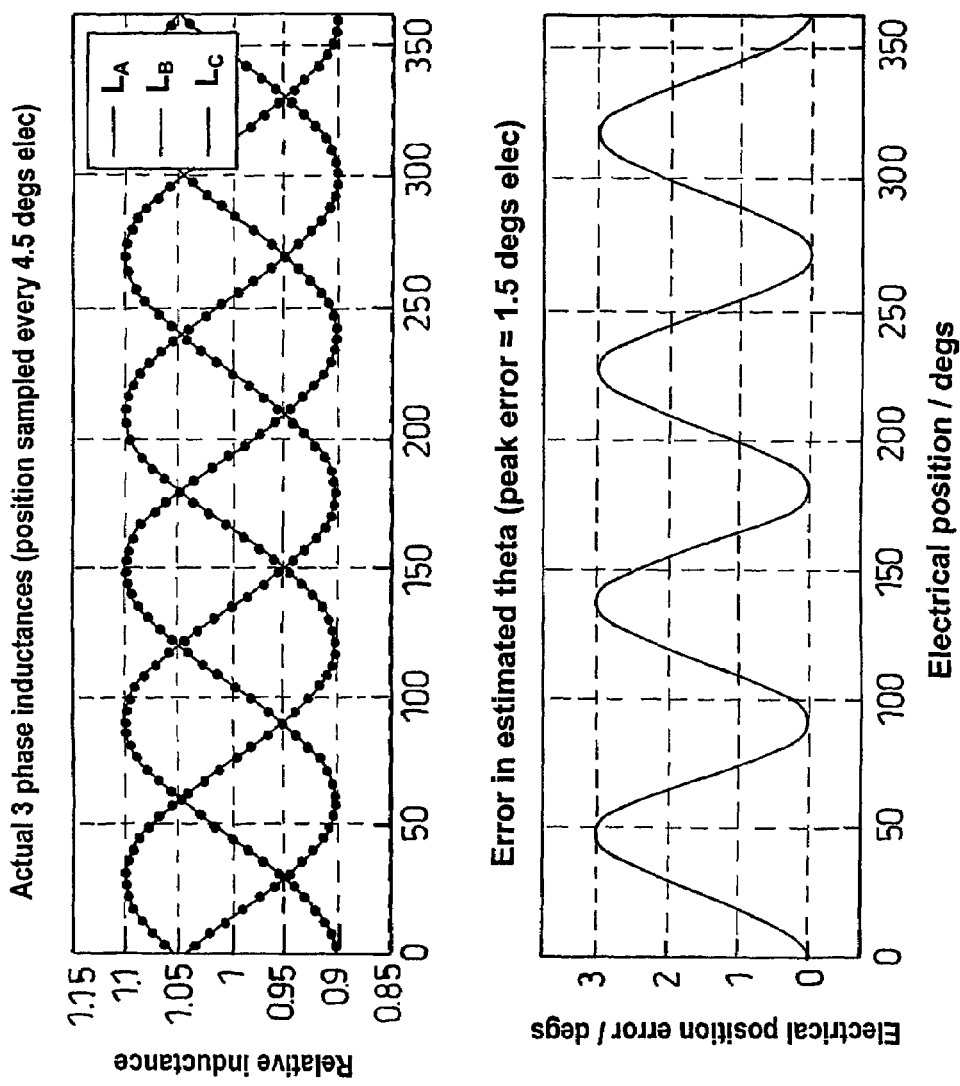
FIG. 23 shows the measured phase inductances and estimated errors in position measurements in the method of FIG. 21.

FIG. 23 shows the simulated error in the computed rotor position obtained for this method when the inductances are measured in pairs. It can be seen that the position error varies sinusoidally at a rate four times the electrical frequency. It has been found empirically that the maximum error is approximately equal to one third of $\Delta\theta$. It should be noted that since the estimate is based on a combination of current and previous measurements, the bandwidth of the position signal will be slightly less than for the three simultaneous readings due to the increased time delay.

Figure 22:
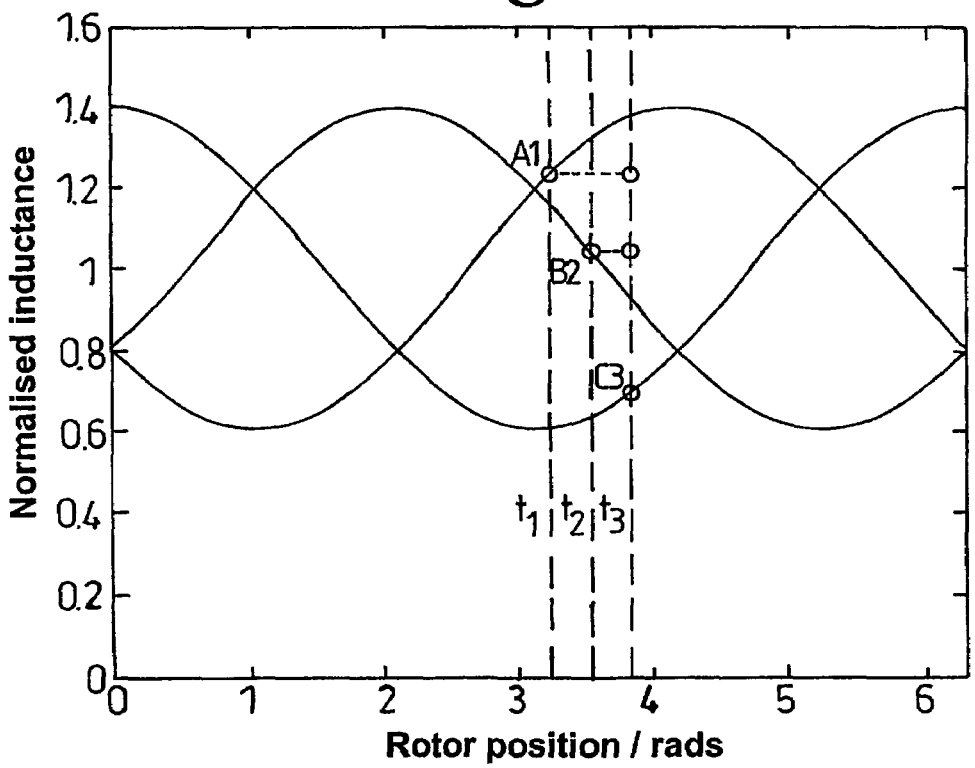
FIG. 22 shows as further method of measuring rotor position in the system of FIG. 4.

When only one inductance is measured at a time, the position is calculated from inductances measured at three different sample times, as shown in FIG. 22. Empirically, the position error is slightly less than two thirds of $\Delta\theta$, which is almost double the error that occurs when the inductances are measured in pairs.

It can be seen that reducing the number of inductance measurements taken simultaneously will reduce the accuracy and bandwidth of the signal, but provided the measurements are taken often enough the reduction in signal quality will be small.

Using the above techniques, it is possible to calculate the position signal at a much higher rate than is achieved with other known voltage injection techniques. Because of this, it is possible in some applications and implementations to apply filtering to the position signal to improve the signal quality. In particular, the position can be fed to an observer to give a more accurate representation.

Potential Noise problems

From the above discussion, it will be appreciated that the two-phase and single-phase inductance measurement techniques are a much more practical solution than the three-phase technique. However, in order to obtain an accurate high-bandwidth position signal using these approaches, it is necessary to swap rapidly between either two test vector patterns (patterns I and II) for the two-phase technique or three test vectors (phases A, B and C) for the single-phase technique.

Figure 24A:
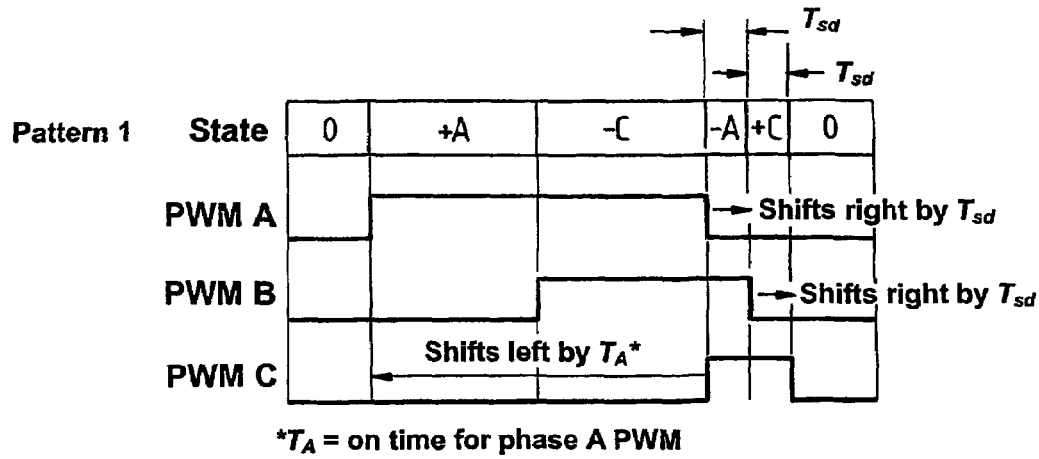
Figure 24B:
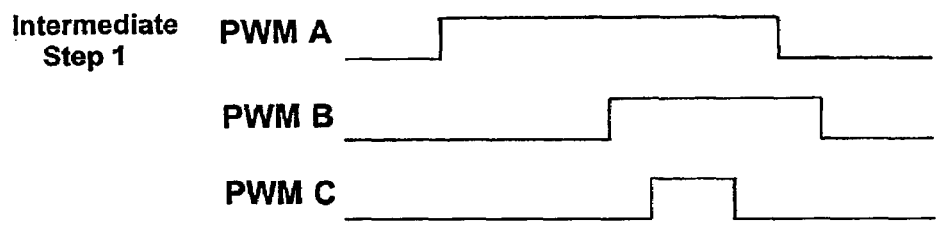
Figure 24C:
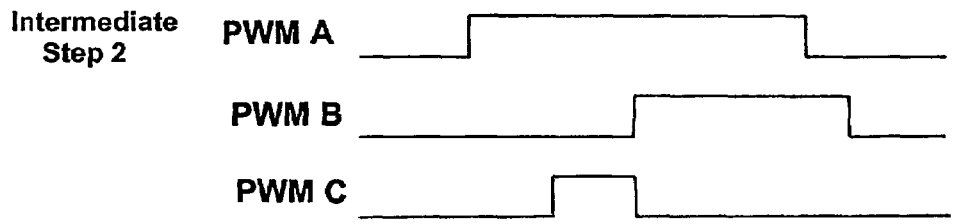
Figure 24D:
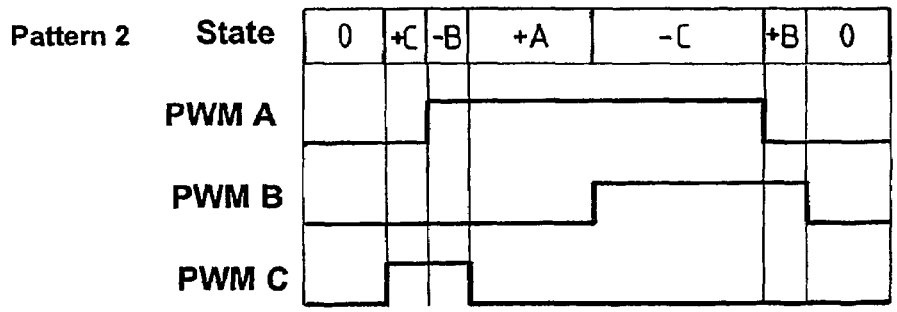

FIGS. 24a to 24d show typical PWM patterns for implementing the two-phase technique in sector 1. It can be seen that to get from pattern I as shown in FIG. 24a which corresponds to FIG. 14a, to pattern II as shown in FIG. 24d which corresponds to FIG. 15a, the waveforms for phase A and B have to shift to the right by a fairly small distance ($T_{sd}$), and the waveform for phase C has to shift by a large distance to the left. In many circumstances, such discontinuous jumps would result in current discontinuities leading to an unacceptable level of acoustic noise. The jump is therefore executed over several PWM cycles. In this case a three-cycle update is used, the two intermediate patterns of FIGS. 24b and 24c being inserted between Pattern I and Pattern II. During PWM periods where the intermediate patterns are being used no inductance measurement is possible. However the frequency of inductance measurement will generally still be sufficient for most applications.

It will be appreciated that the number of intermediate patterns needed will depend on the particular application, and in some cases it may need to be significantly greater than two. It will also be appreciated that the use of intermediate patterns may also be used for the single phase induction measurement.

Alternative Technique—Determining $L_0$ and $\Delta L$

An alternative technique for determining the rotor position is to use knowledge of the mean and peak inductance parameters, $L_0$ and $\Delta L$. If these parameters are known, it is possible to determine position from a single phase inductance measurements by solving the appropriate equation from equations 7(a)–(c). This has the advantage that rather than alternating between different phase inductance measurements every sample, the same phase can be used for inductance measurements over a complete sector. This can reduce the potential acoustic noise problems described above with reference to FIGS. 24a to 24d. Furthermore, if the inductances are measured in pairs, it may be possible to use the redundancy of the extra variable to correct any inaccuracies in the measurement.

Position estimates made in this manner can be highly sensitive to errors in the values of $\Delta L$ and $L_0$. Factors such as motor temperature cause these values to drift during operation, so it is therefore preferable to estimate these values online and update them as often as possible. This can be done in the same manner as above, by taking successive inductance readings from separate phases, and using a combination of old and new measurements for the inductance of each phase to determine $\Delta L$ and $L_0$. One particularly convenient way to do this is to measure the inductances in pairs, with the same pair being measured over a whole sector, for example using patterns I from FIG. 14a for the whole of sector 1. On the transition from one sector to the next, all three inductances are known within a maximum delay of one sample, so $\Delta L$ and $L_0$ can be determined. The main criterion is that $\Delta L$ and $L_0$ are updated often enough to follow any parameter drift. Updating each time the demanded voltage moves from one sector of the state vector diagram to the next will generally provide a fast enough update rate to achieve this.

This technique may be less successful in motor topologies where the q-axis inductance varies significantly with the torque-producing current, as would be the case in some buried magnet motor designs. In this case, rapid variations of $\Delta L$ and $L_0$ can be expected for rapid changes in the torque output of the machine. It is possible in some circumstances to use a model of the motor characteristics to compensate for this in a feed-forward manner. However, where this is not possible, the methods described above with reference to FIGS. 21 and 22 are generally more appropriate.

Measuring the Rate of Change of Current

A number of methods can be used to determine the rate of change of current (di/dt) in the phase windings to enable the inductance to be determined. One method is to put a current sensor in each phase winding, measure the current at one instant, measure it a short time later and compute the difference. This technique is also suitable for single current-sensor techniques. For example in the embodiment of FIG. 4 the di/dt sensor can be deleted and the rate of change of current measured using multiple samples of the current sensor 34. The disadvantage of this technique is the time required for taking the two current measurements to determine di/dt. This can result in an impracticably large value of $T_{sd}$. Furthermore the quantisation limits of the analogue to digital converter (ADC) are likely to result in a very low-resolution di/dt signal.

Figure 4:
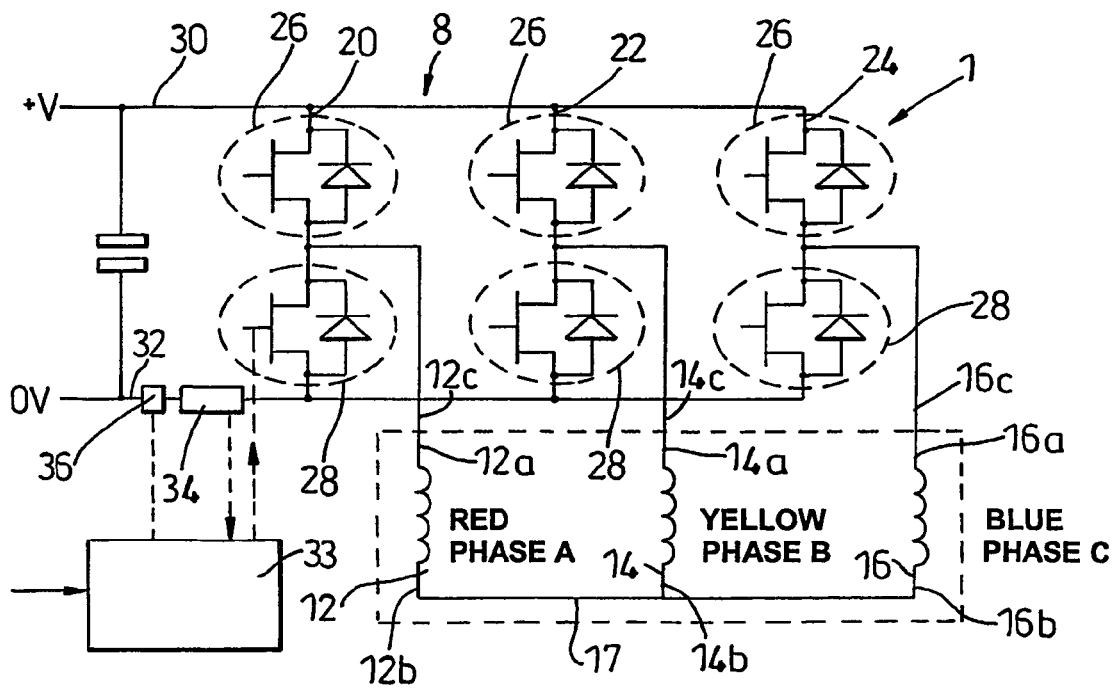
FIG. 4 is diagram of a drive circuit for a motor according to the invention.

These problems are overcome in the system of FIG. 4 by using the di/dt sensor 36 in the DC-link return path. This sensor only needs to be sampled once to determine the rate of change of current, which can significantly reduce $T_{sd}$, as well as improving the resolution of the di/dt signal.

Figure 25:
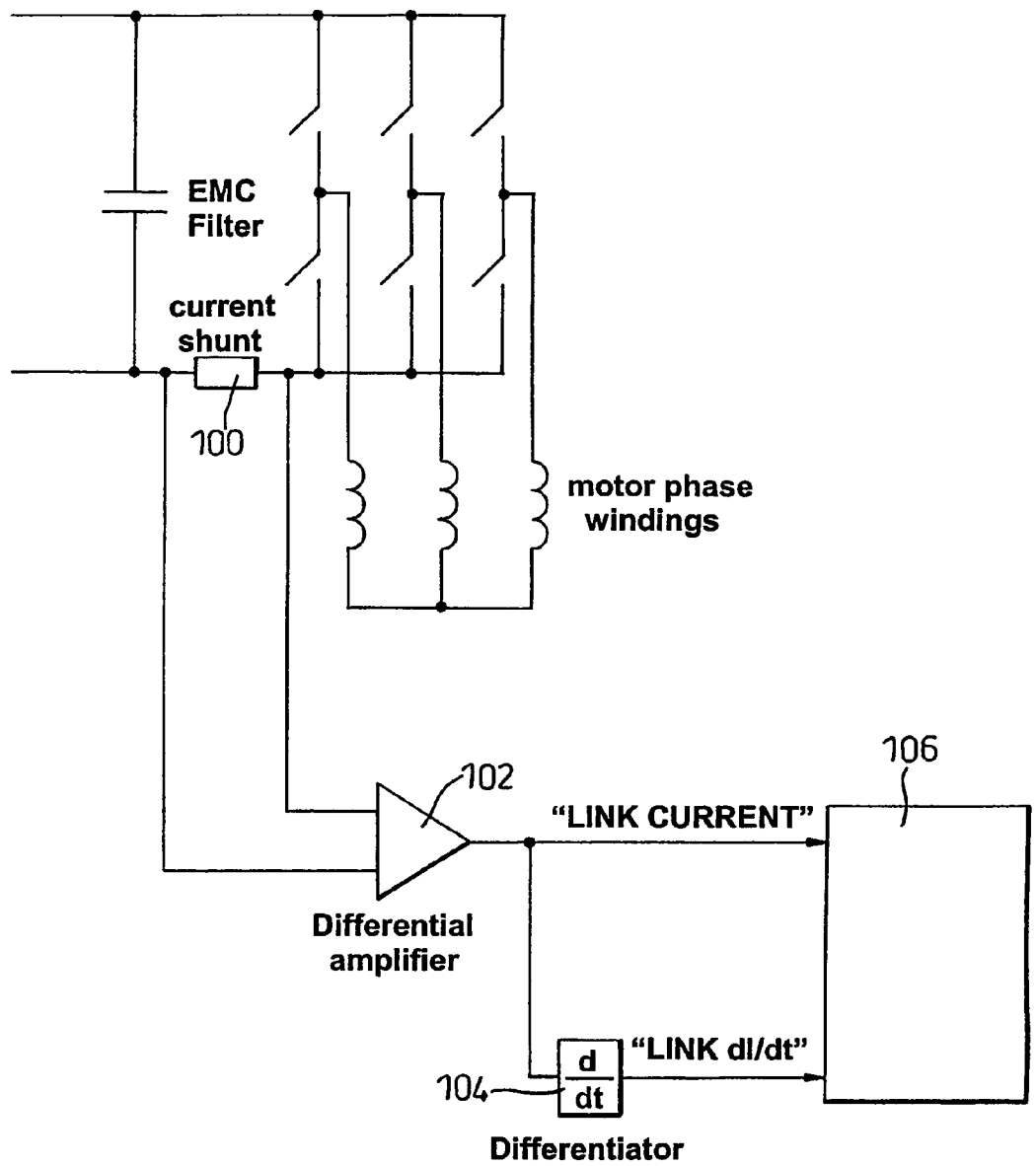
FIG. 25 shows an alternative circuit for current an inductance measurement according to a further embodiment of the invention.

Referring to FIG. 25, in an alternative arrangement the current sensor comprises a resistor 100 and a differential amplifier 102 the output of which varies with the voltage across the resistor 100 and therefore with the current flowing through it. An analogue differentiator 104 is arranged to differentiate the signal from the current sensor. The differentiated current measurement signal is then input to a separate A/D port on the digital controller 106, enabling the current and the rate of change of current to be determined simultaneously. Although differentiators can be noise sensitive, the signal would be measured between PWM edges, and would therefore be relatively insensitive to switching noise. Further noise reduction can be achieved by sampling the input over several PWM periods and taking the average value.

Figure 1:
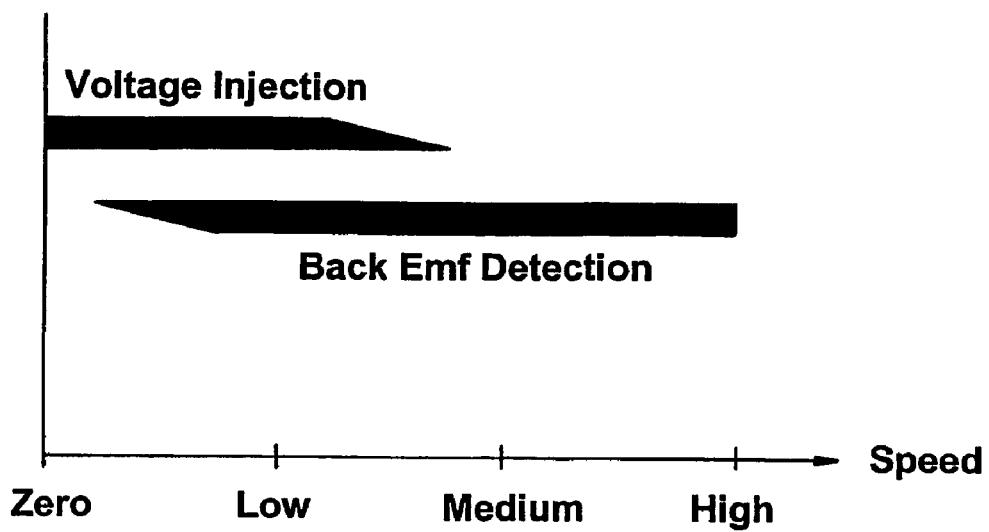
FIG. 1 shows the motor speeds at which two known methods of position sensing are used.

The embodiments described can provide sensorless control over the entire speed range by combining back-emf observer techniques with the voltage injection technique described, in a similar manner to that shown in FIG. 1. The embodiments described are specifically tailored for use in a single current-sensor system, which makes them ideal for automotive applications. The only additional hardware required over known systems is a single di/dt sensor for the DC-link return line, and an additional ADC port on the microcontroller. If an analogue differentiator is used to differentiate the signal from the current sensor, the number of physical sensors can be reduced further.

It will be appreciated that the invention is, however, also applicable to systems with multiple current sensors, which have one current sensor in each phase of the motor. Such systems are more costly than single current sensor systems but are preferred in some applications.

To overcome the acoustic noise problem, the system of the invention incorporates a suitable test voltage pattern into the PWM pattern, rather than using the approach of interrupting the PWM to inject a separate test pattern. Since the PWM is not interrupted, the acoustic noise resulting from the test patterns can be considerably lower than with known voltage injection systems.

Furthermore, since the test voltage can, in most cases, be incorporated into every PWM cycle, the phase inductances can be determined much more frequently than with known techniques, which improves the dynamic characteristics of the position estimation signal. It also allows new techniques for calculating the position from the inductances.

It will be appreciated that the invention is also applicable to other types of brushless machines including synchronous reluctance motors and inductance motors in which there is a degree of rotor saliency.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A drive system for a multi-phase brushless electric motor comprising a plurality of phases, the system comprising:
   a drive circuit including at least one switch arranged to vary the phase voltage applied across each of the phases, and;
   a controller arranged to control the at least one switch so as to provide PWM control of the phase voltages to produce PWM voltage patterns thereby to control a mechanical output of the motor, wherein the controller is further arranged to control the PWM voltage patterns so as to include a test period, to measure a rate of change of current in at least one of the phases during the test period and to determine therefrom an inductance of at least one of the phases thereby to determine a rotational position of the motor wherein the controller is arranged to define at least one pair of test periods such that the phase voltages in one of the pair of test periods are opposite to those in the other of the pair of test periods and the controller is arranged to determine from currents measured in the pair of test periods the inductance of one of the phases wherein the pair of test periods are both provided in the same PWM period.

2. A system according to claim 1 wherein the controller is arranged to measure the inductance of all of the phases in a single PWM period.

3. A system according to claim 2 wherein the controller is arranged to switch the at least one switch to a number of conducting states during a number of output producing periods in a PWM period so as to produce a required motor output, and to a number of conducting states during said test periods, wherein the test periods are of sufficient length that the output producing periods and the test periods take up the whole of the PWM period.

4. A system according to claim 1 wherein the controller is arranged to measure the inductance of only some of the phases in a single PWM period.

5. A system according to claim 4 for a motor having three phases, wherein the controller is arranged to measure the inductance of only two of the phases in a single PWM period.

6. A system according to claim 5 wherein for any position of the motor two pairs of phases can be selected from the three phases for which the inductance can be measured so that the PWM period includes a zero volt state, and the controller is arranged to measure the inductance of one of the pairs of phases in one PWM period and the other pair of phases in a subsequent PWM period.

7. A system according to claim 6 wherein the controller is arranged to alternate inductance measurement between said pairs of phases in successive PWM periods.

8. A system according to claim 1 wherein the controller is arranged to measure the inductance in only one of the phases in any one PWM period.

9. A system according to claim 3 wherein the controller is arranged to vary the phase or phases for which the inductance is measured so that, over a number of PWM periods, the inductance of all of the phases is measured.

10. A system according to claim 8 wherein the controller is arranged to provide a first PWM pattern in a first PWM period to allow inductance measurement of at least one phase and a second, different PWM pattern in a second PWM period to allow inductance measurement of at least one phase not measured in the first PWM period, and to produce at least one intermediate PWM pattern in a PWM period between the first and second periods, the intermediate pattern being intermediate in shape between the first and second patterns.

11. A system according to claim 10 wherein the controller is arranged not to measure the inductance of the phases in the intermediate PWM period.

12. A system according to claim 1 wherein the controller is arranged to determine the position of the motor in each PWM period.

13. A system according to claim 12 wherein the controller is arranged to determine the position of the motor on the basis of the last measured value of inductance for each of the phases.

14. A system according to claim 1 wherein the controller is arranged to determine mean and peak values of the inductance of one of the phases as it oscillates during rotation of the motor, the controller also being arranged to measure an instantaneous inductance of that phase, and further wherein the controller is arranged to determine the position of the motor from the mean and peak and instantaneous values of the inductance.

15. A system according to claim 14 wherein the controller is arranged such that, for all values of a demanded voltage which can be produced from the same pair of primary voltages the inductance of the same two phases is measured, and when the demanded voltage changes so that a different pair of primary voltages are required and a different pair of inductances are measured, the most recently measured values of the inductances of all of the phases are used to determine the mean and peak values of the inductance.

16. A system according to claim 1 further comprising a single current sensor arranged to measure the current in the phases during the test periods.

17. A system according to claim 16 wherein the controller is arranged to measure a magnitude of the current in two phases in each PWM period using the current sensor thereby to determine currents in all of the phases.

18. A system according to claim 17 wherein the test periods are each sufficiently long to allow the magnitude of the current in one of the phases to be measured by the current sensor.

19. A system according to claim 1 wherein the controller is arranged to measure the inductance in only one of the phases in any one PWM period, and to provide a first PWM pattern in a first PWM period to allow inductance measurement of at least one phase and a second, different, PWM pattern in a second PWM period to allow inductance measurement of at least one phase not measured in the first PWM period, and to produce at least one intermediate PWM pattern in a PWM period between the first and second PWM periods, the intermediate PWM pattern being intermediate in shape between the first and second PWM patterns, the system further comprising a single current sensor arranged to measure the current in the phases during the test periods and the controller being arranged to measure a magnitude of the current in two phases in each PWM period using the current sensor thereby to determine currents in all of the phases.

20. A system according to claim 19 wherein the controller is arranged to define a group of demanded voltages which could be produced by switching the at least one switch between two conducting states and the time required in at least one of the conducting states is insufficient to allow measurement of the magnitude of the current, and for those demanded voltages to add further test periods of zero net voltage and sufficient length to enable the magnitude of the current in one of the phases to be measured.

21. A system according to claim 20 wherein the further test periods are only added in some pulse width modulation periods.

22. A system according to claim 21 wherein the extra test periods are only added when the inductance measuring test periods and the output producing periods together do not provide sufficient time in each of two conducting states within one PWM period to allow the magnitude of the current in one of the phases to be measured.

23. A system according to claim 1 including a current sensor and a differentiator arranged to differentiate the output from the current sensor thereby to measure the phase inductances.

24. A system according to claim 23 wherein a single current sensor is used for measurement of the magnitude of the current and inductance measuring.

25. A system according to claim 1 further comprising a plurality of current sensors for measuring the currents in the phases.

26. A system according to claim 25 wherein said current sensors comprise one current sensor for each of said phases.

27. A method of controlling a multi-phase brushless electric motor comprising a plurality of phases, the system comprising a drive circuit including at least one switch arranged to vary the phase voltage applied across each of the phases, the method comprising controlling the at least one switch so as to provide PWM control of the phase voltages to produce PWM voltage patterns thereby to control a mechanical output of the motor, wherein the method further comprises controlling the PWM voltage patterns so as to include a test period, measuring a rate of change of current in at least one of the phases during the test period, and determining therefrom an inductance of at least one of the phases thereby to determine a rotational position of the motor.

* * * * *